(12) United States Patent
Nakata

(10) Patent No.: US 12,228,663 B2
(45) Date of Patent: Feb. 18, 2025

(54) BASE STATION DEVICE AND TERMINAL DEVICE

(71) Applicant: DENSO CORPORATION, Kariya (JP)

(72) Inventor: Tsuneo Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 270 days.

(21) Appl. No.: 17/722,442

(22) Filed: Apr. 18, 2022

(65) Prior Publication Data

US 2022/0342029 A1  Oct. 27, 2022

(30) Foreign Application Priority Data

Apr. 21, 2021 (JP) .................. 2021-072190

(51) Int. Cl.
*H04L 5/00* (2006.01)
*G01S 5/00* (2006.01)
*H04W 16/28* (2009.01)
*H04W 72/1263* (2023.01)

(52) U.S. Cl.
CPC .......... *G01S 5/0063* (2013.01); *H04L 5/0051* (2013.01); *H04W 16/28* (2013.01); *H04W 72/1263* (2013.01)

(58) Field of Classification Search
None
See application file for complete search history.

(56) References Cited

U.S. PATENT DOCUMENTS

| 11,277,180 | B1* | 3/2022 | Raghavan | ............ H01Q 3/2617 |
|---|---|---|---|---|
| 2013/0310067 | A1 | 11/2013 | Nakata et al. | |
| 2020/0145977 | A1* | 5/2020 | Kumar | ................. G01S 5/12 |
| 2021/0337531 | A1* | 10/2021 | Manolakos | ............ H04B 17/27 |
| 2021/0345289 | A1 | 11/2021 | Priyanto et al. | |
| 2022/0155404 | A1* | 5/2022 | Kumar | ............... G01S 5/02213 |
| 2022/0311488 | A1* | 9/2022 | Shreevastav | ......... H04B 7/0408 |
| 2022/0322330 | A1* | 10/2022 | Kumar | ................. H04L 5/0069 |

FOREIGN PATENT DOCUMENTS

| JP | H11-178045 A | 7/1999 |
|---|---|---|
| JP | 2013-257306 A | 12/2013 |
| JP | 5641073 B2 | 12/2014 |
| WO | WO-2020/069283 A1 | 4/2020 |

* cited by examiner

*Primary Examiner* — Ajit Patel
(74) *Attorney, Agent, or Firm* — Harness, Dickey & Pierce, P.L.C.

(57) ABSTRACT

A base station device includes: a beamforming setting information obtaining unit obtaining a plurality of beamforming setting information; a positioning reference signal generation unit generating a plurality of positioning reference signals using each of the plurality of beamforming setting information; a schedule information obtaining unit obtaining schedule information indicating a transmission schedule of the plurality of the positioning reference signals; and a transmission unit transmitting each of the plurality of positioning reference signals based on the schedule information.

19 Claims, 15 Drawing Sheets

FIG. 5

BEAMFORMING SETTING INFO

| IDENTIFICATION ID | BASE STATION ID | TRANSMISSION WEIGHT |
|---|---|---|
| a1 | 10a | W1 |
| a2 | 10a | W2 |
| a3 | 10a | W3 |
| a4 | 10a | ... |
| a5 | 10a | ... |
| a6 | 10a | ... |

FIG. 6

SCHEDULE INFO

| IDENTIFICATION ID | BASE STATION ID | TRANSMISSION PERIOD (SYMBOL USED) | TRANSMISSION TIME |
|---|---|---|---|
| a1 | 10a | #1 | 8:00 - 9:00 |
| a2 | 10a | #2 | 8:00 - 9:00 |
| a3 | 10a | #3 | 8:00 - 9:00 |
| a4 | 10a | #1 | 9:00 - 10:00 |
| a5 | 10a | #2 | 9:00 - 10:00 |
| a6 | 10a | #3 | 9:00 - 10:00 |

DATA FRAME TRANSMITTED FROM BASE STATION DEVICE 10a

DATA FRAME TRANSMITTED FROM BASE STATION DEVICE 10b

DATA FRAME TRANSMITTED FROM BASE STATION DEVICE 10c (SYMBOL #1)

(SYMBOL #2)

(SYMBOL #3)

DATA FRAME

SCHEDULE INFO

FIG. 14

SIGNAL SPECIFICATION INFO

| IDENTIFI-CATION ID | BASE STATION ID | TRANS-MISSION WEIGHT | USE Ch | ROAD AREA | TRANS-MISSION TIME | MAP STATE | MAP SCORE | WEATHER CONDITION |
|---|---|---|---|---|---|---|---|---|
| a1 | 10a | W1 | Ch1-Ch10 | R1 | 8:00-9:00 | ○ | 0.8 | SHINE |
| a2 | 10a | W2 | Ch1-Ch10 | R2 | 8:00-9:00 | ○ | 0.9 | SHINE |
| a3 | 10a | W3 | Ch1-Ch10 | R3 | 8:00-9:00 | △ | 0.85 | SHINE |
| b1 | 10b | W1 | Ch1-Ch10 | R4 | 8:00-9:00 | × | - | RAIN |
| b2 | 10b | W2 | Ch1-Ch10 | R5 | 8:00-9:00 | ○ | 0.75 | RAIN |
| b3 | 10b | W3 | Ch1-Ch10 | R6 | 8:00-9:00 | ○ | 0.95 | RAIN |
| c1 | 10c | W1 | Ch1-Ch10 | R7 | 8:00-9:00 | ○ | 0.85 | SNOW |
| c2 | 10c | W2 | Ch1-Ch10 | R8 | 8:00-9:00 | △ | 0.3 | SNOW |
| c3 | 10c | W3 | Ch1-Ch10 | R9 | 8:00-9:00 | ○ | 0.9 | SNOW |
| ⋮ | | | | | | | | |
| a7 | 10a | W7 | Ch11-Ch20 | R1 | 8:00-9:00 | ○ | 0.6 | SHINE |
| a8 | 10a | W8 | Ch21-Ch30 | R1 | 8:00-9:00 | ○ | 0.65 | RAIN |

# BASE STATION DEVICE AND TERMINAL DEVICE

CROSS REFERENCE TO RELATED APPLICATION

The present application is based on and claims the benefit of priority of Japanese Patent Application No. 2021-072190, filed on Apr. 21, 2021, the disclosure of which is incorporated herein by reference.

TECHNICAL FIELD

The present disclosure generally relates to a base station device and a terminal device, a method to be performed by these devices, and programs that can be executed by these devices.

BACKGROUND INFORMATION

Conventionally, GNSS (Global Navigation Satellite System) represented by GPS (Global Positioning System) is well known as a position/location information service. GNSS obtains an absolute position of a terminal device on the earth by using radio waves from a positioning satellite such as a GPS satellite and signal data carried by the radio waves. When a vehicle is assumed as a terminal device, a current position can be accurately and sequentially obtained by using the signal data in combination with a vehicle speed signal, an acceleration sensor, and a gyro sensor of the vehicle.

The position accuracy of the GNSS may fluctuate greatly depending on the number of receivable positioning satellites and the state of satellite arrangement in the sky, and in urban areas, the position accuracy may deteriorate significantly due to the influence of multipath. In addition, GNSS may be not receivable in the first place in tunnels, underpasses, mountainous areas, etc.

SUMMARY

It is an object of the present disclosure to enable a terminal device to perform positioning even when GNSS is not available by generating and providing information suitable for a terminal device to perform positioning using wireless communication, or as well as improving accuracy of positioning by the terminal device.

With the above-described configuration, the present disclosure can enable positioning even when GNSS cannot be used, or can improve the positioning accuracy of the terminal device.

BRIEF DESCRIPTION OF THE DRAWINGS

Objects, features, and advantages of the present disclosure will become more apparent from the following detailed description made with reference to the accompanying drawings, in which:

FIG. 5 is an explanatory diagram illustrating beamforming setting information according to the embodiment of the present disclosure;

FIG. 6 is an explanatory diagram illustrating schedule information according to the embodiment of the present disclosure;

FIG. 14 is an explanatory diagram illustrating signal specification information according to the embodiment of the present disclosure;

DETAILED DESCRIPTION

Figure 1:
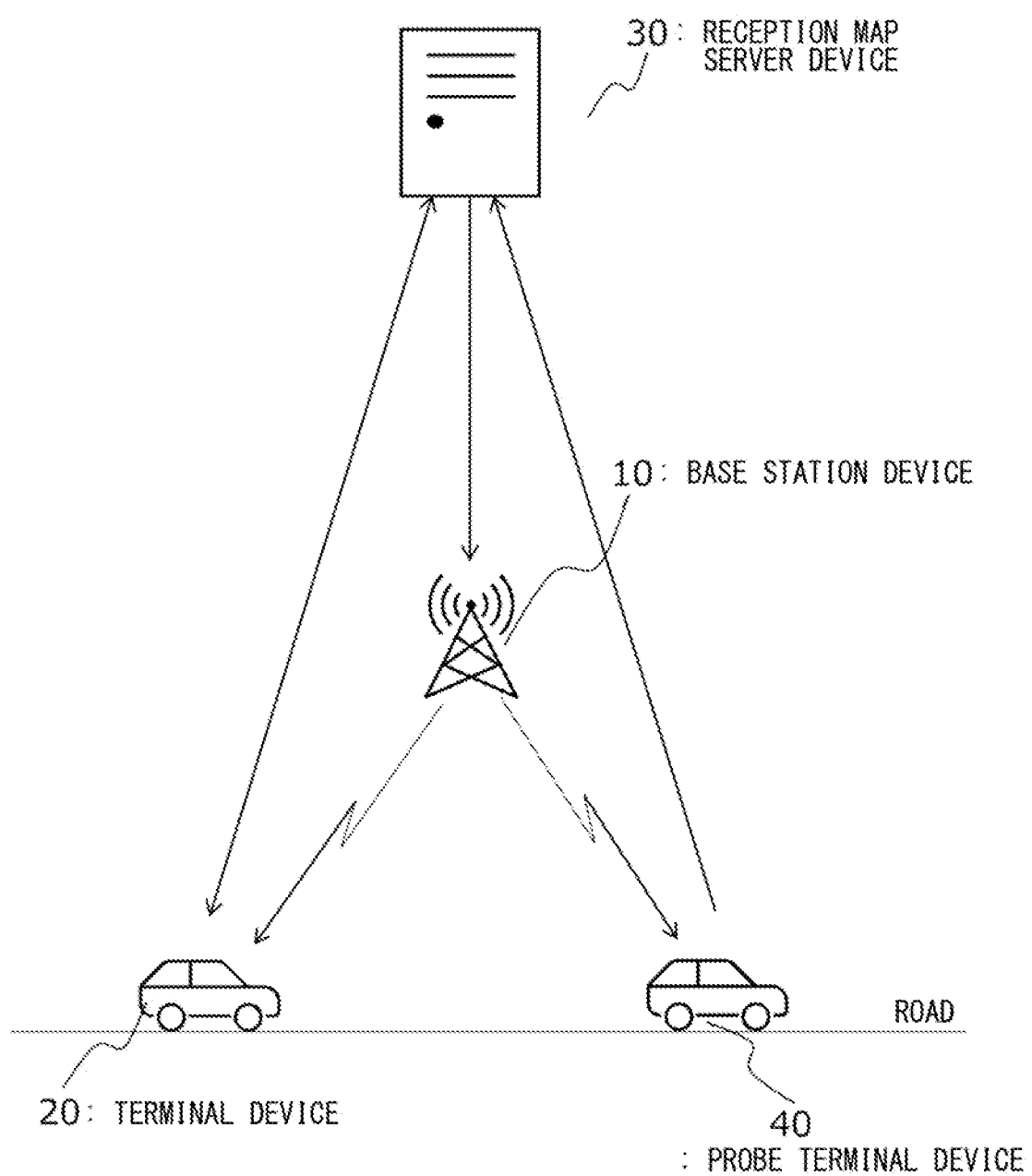
FIG. 1 is a diagram showing an overall configuration of an embodiment of the present disclosure.

Embodiments of the present disclosure will be described below with reference to the drawings.

The present disclosure means a disclosure described in a section of claims or a summary section, and is not limited to the following embodiments. Further, at least the words in brackets mean the words and phrases described in the section of claims or in the summary section, and are not limited to the following embodiments.

The configurations and methods described in dependent claims are arbitrary configurations and methods in the disclosure described the independent claims. The configurations and methods of the embodiments corresponding to the configurations and methods described in the dependent claims, and the configurations and methods described only in the embodiments that are not described in the claims are, respectively, arbitrary configurations and methods in the present disclosure. The configuration and method described in the embodiment when the description of the claims is broader than the description of the embodiment is also an arbitrary configuration and method in the present disclosure in a sense that it is an example of the configuration and method of the present disclosure. In either case, the description in the independent claims provides an essential configuration and method of the present disclosure.

Any effects described in the embodiments are effects obtained by a configuration of an embodiment as an example of the present disclosure, and are not necessarily effects of the present disclosure.

When there are multiple embodiments, a configuration disclosed in each embodiment is not limited to each embodiment, but can be combined across embodiments. For example, a configuration disclosed in one embodiment may be combined with other embodiment(s). Configurations disclosed the respective multiple embodiments may be collected and combined.

A difficulty described above is not a publicly known matter but is originally found by an applicant of the present application, and is a fact that confirms non-obviousness of the present application together with a configuration and a method described in the present application.

1. General Remarks
(1) Overall Configuration

First, devices used in the present embodiment and the overall configuration showing a relationship therebetween will be described with reference to FIG. 1.

A base station device 10 is a device that provides information required for a terminal device 20 to perform positioning using wireless communication. Specifically, the base station device 10 generates a plurality of positioning reference signals using each of a plurality of beamforming setting information, and transmits the generated plurality of positioning reference signals to the terminal device 20. The plurality of positioning reference signals are transmitted based on their respective schedule information.

The terminal device 20 is a device that performs positioning using information provided by the base station device 10 and a reception map server device 30. Specifically, the terminal device 20 receives the positioning reference signal from the base station device 10, and receives a reception radio wave map from the reception map server device 30, and the terminal device 20 obtains a current position of the terminal device 20 itself based on a measurement result of a reception status of the positioning reference signal and the reception radio wave map.

Note that the terminal device 20 selects a positioning reference signal to be used for positioning from among a plurality of positioning reference signals based on the schedule information. In such case, the schedule information is obtainable from the base station device 10, the reception map server device 30, or from other devices.

In FIG. 1, the terminal device 20 is described as an in-vehicle terminal "mounted" on a vehicle that is a "mobile body", but the terminal device 20 is not necessarily limited to an in-vehicle terminal. It may be carried by humans or animals, or it may be a terminal mounted on a ship or an aircraft. The aircraft may be an unmanned aerial vehicle (UAV) such as a drone. Now, the "mobile body" means a movable object, and a moving speed thereof is arbitrary. Naturally, this also includes a case where the mobile object is stopped. Examples of the mobile object include, but are not limited to, automobiles, motorcycles, bicycles, pedestrians, ships, aircrafts, and objects mounted thereon. The term "mounted" includes a case where it is directly fixed to the mobile body and a case where it is not fixed to the mobile body but moves together with the mobile body. For example, there may be a case where a person riding on a mobile body carries the terminal device 20, or a case where the terminal device 20 is mounted on a load that is placed/put on a mobile body.

The reception map server device 30 manages a reception radio wave map for use by the terminal device 20 for positioning, and provides the terminal device 20 with the reception radio wave map. Further, the reception map server device 30 may transmit the schedule information of the positioning reference signal together with the reception radio wave map.

A probe terminal device 40 is a device that collects information required for generating a reception radio wave map and transmits it to the reception map server device 30.

Next, a communication method for connecting each of the above-mentioned devices will be described.

The base station device 10 performs wireless communication with the terminal device 20 and the probe terminal device 40 by using a predetermined wireless communication method. Wireless communication includes unicast mode and multicast mode, which are communications that specify the other party, as well as broadcast mode that does not specify the other party.

The wireless communication method may be any method in which a reference signal can be inserted. For example, OFDMA (Orthogonal Frequency Division Multiple Access), TDMA (Time Division Multiple Access), CDMA (Code Division Multiple Access), CSMA (Carrier Sense Multiple Access) and the like can be used. Further, the wireless communication method may be a radio wave, a light wave, or a sound wave. The base station device 10 is a device corresponding to any of these communication methods. In the following embodiment, it is assumed that the OFDMA communication method widely used in cellular communication is used.

The reception map server device 30 communicates with the base station device 10 using wired communication. A gateway device (not shown) is provided between the reception map server device 30 and the base station device 10, and an Internet network to which the reception map server device 30 is connected and a backbone line to which the base station device 10 is connected are connected with each other. Of course, the reception map server device 30 may be directly connected to the backbone line instead of the Internet network. Further, the reception map server device 30 may communicate with the base station device 10 by using wireless communication instead of wired communication.

The reception map server device 30 communicates with the terminal device 20 and the probe terminal device 40 using wireless communication and/or wired communication. As the wireless communication method, any method may be used regardless of whether the method of wireless communication is existing or new. As the wired communication method, for example, a LAN (Local Area Network), the Internet, or a fixed telephone line can be used. The wired communication may be used/usable, when a vehicle equipped with the terminal device is parked in a parking lot at home or other places, or is deposited to a repair shop. In addition, the reception map server device 30 may communicate with the terminal device 20 and the probe terminal device 40 via the base station device 10.

Note that, in FIG. 1, one reception map server device 30, one base station device 10, one terminal device 20, and one probe terminal device 40 are drawn, but there may be a plurality of these devices. Further, the reception map server device 30 and the base station device 10 may be configured as one-body device. That is, the base station device 10 may have all or a part of functions of the reception map server device 30. Further, the terminal device 20 and the probe terminal device 40 may be integrally configured. That is, the terminal device 20 may have all or a part of functions of the probe terminal device 40.

Details of each device and the signals and information transmitted and received between the devices will be described in detail.

(2) Positioning Reference Signal and Reception Radio Wave Map

The positioning reference signal and the reception radio wave map of the present embodiment will be described with reference to FIGS. 2A and 2B.

First, the positioning reference signal will be described with reference to FIG. 2A. The positioning reference signal is a signal transmitted from the base station device 10 to the terminal device 20, and is a signal used by the terminal device 20 to estimate its own position. In FIG. 2A, RS is a positioning reference signal.

In the following, a technique for estimating the position will be described as synonymous with positioning.

While the base station device 10 establishes wireless communication separately with each of the plurality of terminal devices 20, it notifies (e.g., broadcasts) common information common to the plurality of terminal devices 20 such as communication quality measurement, communication parameters, synchronization information, and the like. The positioning reference signal may be provided as common information, or may be provided to each terminal device as information unique to each terminal device 20.

The positioning reference signal is an arbitrary signal generated by the base station device 10. For example, in case of OFDM (Orthogonal Frequency Division Multiplexing) communication, the intensity and phase are kept constant at a predetermined value within an OFDM symbol assigned to a positioning reference signal, or are changed according to a predetermined sequence. However, since it is not essential for the terminal device 20 to perform processing based on this information (e.g., propagation path estimation, correction for synchronization, etc.) just like the reference signal used in communication, it is also not essential for the terminal device 20 that the positioning reference signal is known to the terminal device 20.

Further, the base station device 10 can change a directivity characteristic of a transmission beam, that is, the beamforming setting, by changing a transmission weight to a plurality of antenna elements.

Figure 2A:
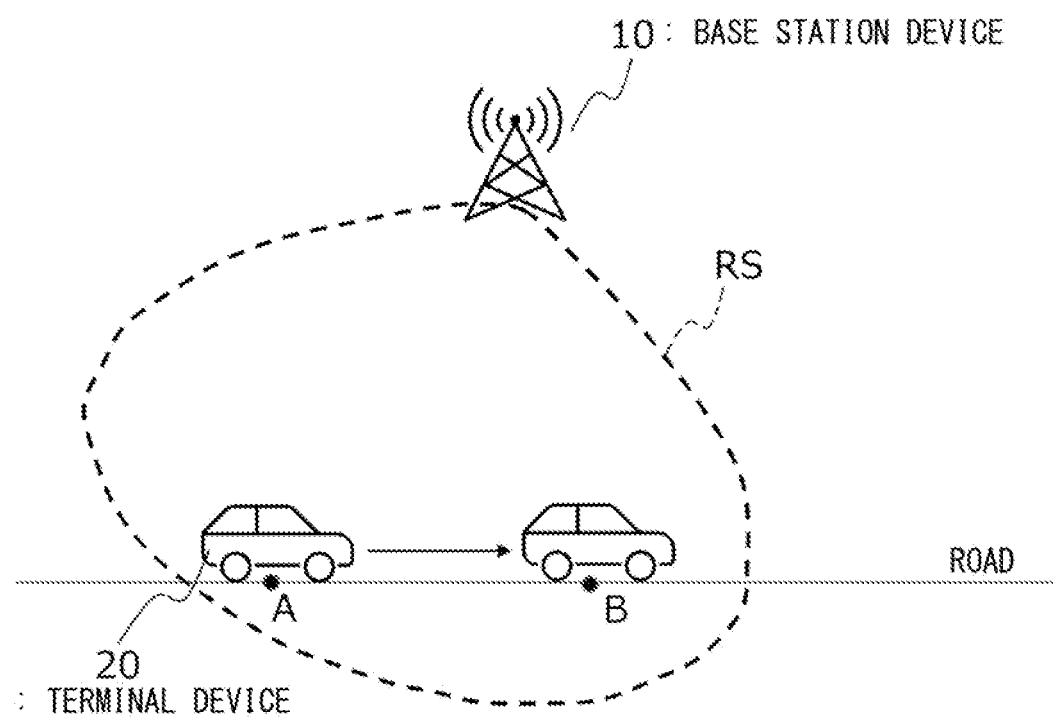
FIGS. 2A and 2B are, respectively, an explanatory diagram illustrating a positioning reference signal and a reception radio wave map generated in the embodiment of the present disclosure.

Therefore, as shown in FIG. 2A, the base station device 10 applies an arbitrary beamforming setting to each positioning reference signal. By changing the beamforming setting, the base station device 10 can narrow down the directivity and can concentrate the positioning reference signal in a desired area, or conversely can make the directivity uniform and can cover as many terminal devices 20 as possible. i.e., can make the terminal devices 20 in as wide an area as possible receive the signal.

FIG. 2A shows a situation in which the positioning reference signal RS to which a specific beamforming setting is applied is receivable by the terminal device 20 while the terminal device 20 moves from a point A to a point B.

Next, the reception radio wave map will be described with reference to FIG. 2B.

Figure 2B:
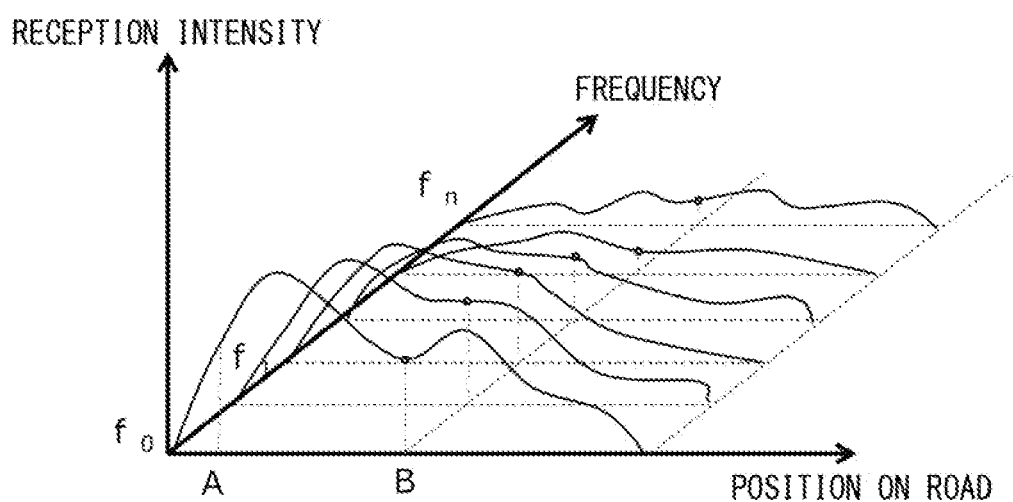

FIG. 2B shows a reception radio wave map corresponding to the positioning reference signal of FIG. 2A. FIG. 2B is a 3-axis graph, in which the horizontal axis represents a position on the road, and the vertical axis represents reception state information when the positioning reference signal is received, such as reception intensity, phase, propagation delay, arrival direction, and the like.

The position on the road represents a position en-route on the road without considering the two-dimensional direction of the road. For example, if there is a large bend from point A to point B on a map, a line segment AB in FIG. 2B represents a length of a trace (i.e., route length) from point A to point B.

Further, the depth direction indicates a frequency. For example, when OFDM is used as a wireless communication method, signals can be transmitted simultaneously on a plurality of subcarriers, that is, a plurality of different frequencies. Generally, if a frequency of the subcarrier is different, a reception state of the subcarrier is accordingly different. Therefore, for example, when 12 subcarriers continuous in a frequency direction are used as the positioning reference signal, each point on the road has 12 values of reception intensity in the frequency direction.

In an example of the reception radio wave map of FIG. 2B, the reception radio wave map has 10 grid points as measurement points for measuring the reception intensity between the points A and B, and has 12 grid points in the frequency direction at each of the 10 grid points, when the reception intensity is measured for the 12 subcarriers. Therefore, the reception radio wave map has 120 grid points between the point A and the point B, and yields data that maps the reception intensity to each of those grid points. Therefore, although a position on the road is one-dimensional, the reception radio wave map of FIG. 2B is a two-dimensional array of data.

Since the reception intensity can fluctuate even at the same position and the same frequency depending on the beamforming setting, the reception radio wave map becomes different by changing the parameters of the beamforming setting of the positioning reference signal, for example. In the present embodiment, since a plurality of beamforming settings can be set for each of the base station devices 10, a reception radio wave map is generated for each of the plurality of beamforming settings.

Further, the reception radio wave map may be generated for each of reception environments such as a weather condition, a terrain condition, and a condition of the terminal device 20, as will be described later.

FIG. 2B shows a reception radio wave map for a position on a one-dimensional road, but of course, it may be a reception radio wave map for each grid point of the two-dimensional map. The reception radio wave map in such case is three-dimensional array data in consideration of frequency.

Note that, in the present embodiment, the reception radio wave map refers to a set of radio wave propagation paths of radio waves transmitted by the base station device 10 at a identified position, but light waves and sound waves can also be used in addition to radio waves. That is, a reception light wave map or a reception sound wave map can also be used. These are collectively called a "reception map".

(3) Positioning Using Positioning Reference Signal and Reception Radio Wave Map

A positioning technique for estimating a position using the positioning reference signal and the reception radio wave map in the present embodiment will be described with reference to FIGS. 3A and 3B.

First, with reference to FIG. 3A, positioning based on reception state information accompanying movement of the vehicle will be described.

It is assumed that the terminal device 20 receives the positioning reference signal RS of the beamforming setting shown in FIG. 2A while moving on a road from a point A to a point B. In such case, in the terminal device 20, a reception intensity measurement pattern Q is obtained by measuring the reception intensity accompanying the movement from the point A to the point B.

Figure 3A:
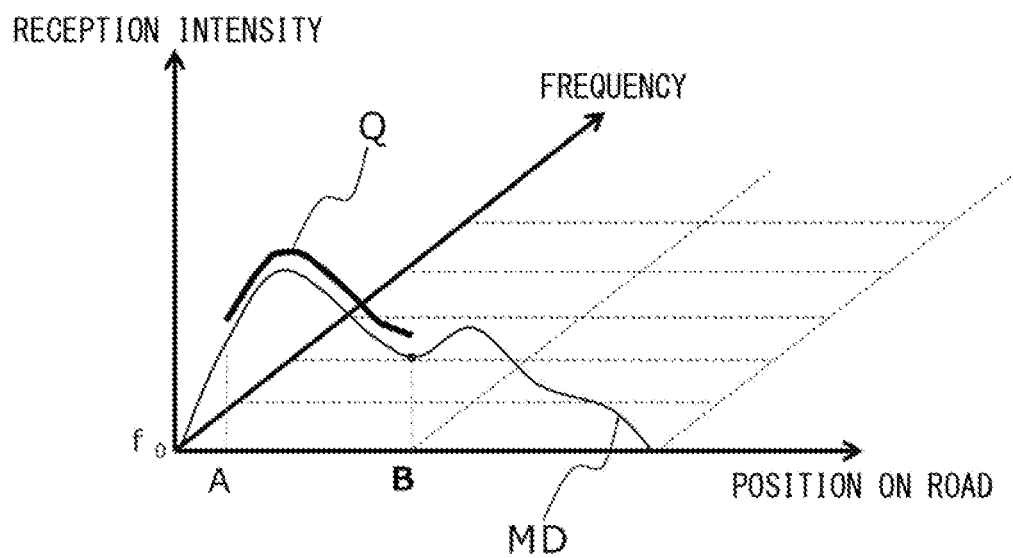
FIGS. 3A and 3B are, respectively, an explanatory diagram illustrating positioning using a positioning reference signal and a reception radio wave map according to the embodiment of the present disclosure.

On the other hand, assuming that the terminal device 20 has a reception radio wave map for the positioning reference signal RS in advance, pattern matching is performed between a reception intensity measurement pattern MD of the reception radio wave map and the reception intensity measurement pattern Q accompanying the movement, and, as a result as shown in FIG. 3A, a point B, which is a position of the terminal device 20 on the road, can be obtained.

Next, positioning based on the reception intensity measurement pattern at a plurality of frequencies will be described with reference to FIG. 3B.

At a point B, the terminal device 20 receives the positioning reference signal RS of the beamforming setting shown in FIG. 2A at a plurality of subcarriers, that is, at a plurality of different frequencies. In the terminal device 20, a reception intensity measurement pattern F at a plurality of frequencies is obtained for the point B.

Figure 3B:
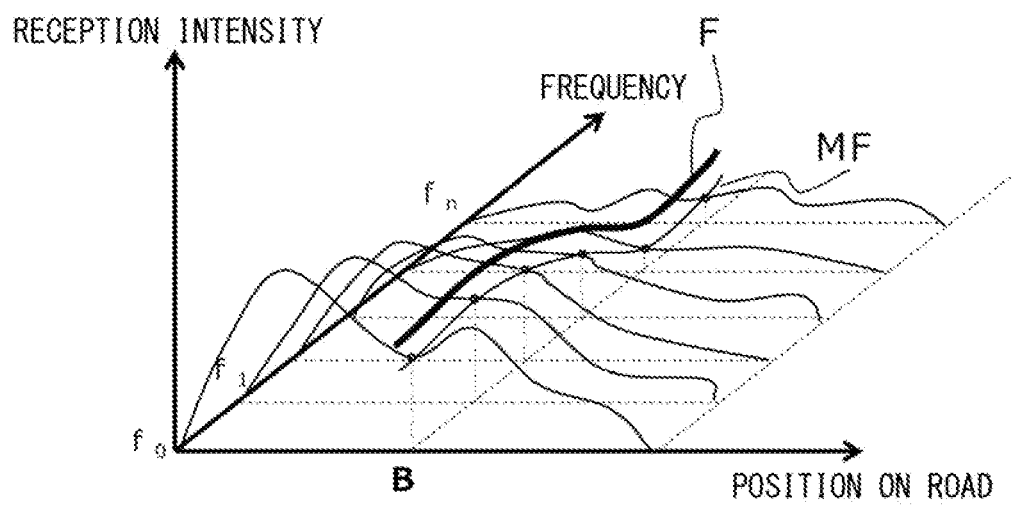

On the other hand, assuming that the terminal device 20 has a reception radio wave map for the positioning reference signal RS in advance, by performing a pattern match between (i) a reception intensity measurement pattern MF at a plurality of frequencies at each position obtained from such reception radio wave map and (ii) the reception intensity measurement pattern F, as shown in FIG. 3B, the point B, which is a position of the terminal device 20 on the road, can be obtained.

Positioning using the positioning reference signal and the reception radio wave map can be performed even in a place where satellite positioning such as GNSS is not possible, and, when a positioning reference signal with an appropriate beamforming setting is selected and by using such a reception radio wave map, an absolute position is accurately obtainable with an error of, for example, within 1 m. Further, in the positioning based on the reception intensity measurement pattern at a plurality of frequencies, when approximate position information of the terminal device 20 is obtainable, such as for example, the terminal device 20 existing in a region between the point A and the point B, an absolute position of the terminal device 20 is accurately obtainable even if the terminal device 20 is stationary, i.e., standing at one position without moving.

A map score can be used, for example, to select a positioning reference signal with an appropriate beamforming setting, which will be described later.

Further, by combining (i) the positioning based on the reception intensity measurement pattern accompanying the movement in FIG. 3A and (ii) the positioning based on the reception intensity measurement pattern at the plurality of frequencies in FIG. 3B, further improvement in positioning accuracy can be expected.

Note that, though pattern matching was performed from the point A to the point B in FIG. 3A, a measured value of the reception intensity at a specific point and a value on the reception radio wave map may also be compared with each other.

In the present embodiment, since the positioning reference signal is generated for each of the plurality of beamforming settings, the terminal device can select the positioning reference signal to be used for positioning from among the plurality of positioning reference signals. Therefore, the terminal device 20 needs to obtain the reception radio wave map corresponding to the selected positioning reference signal. Information required for selecting the positioning reference signal and obtaining the reception radio wave map will be described in a section of the configuration of the base station device 10 and the terminal device 20 described later.

As described above, an absolute position of the terminal device 20 is determinable by comparing a measurement result of the positioning reference signal with a reception radio wave map corresponding to the positioning reference signal without using satellite positioning such as GNSS.

2. Details 1: Base Station Device 10

(1) Configuration of Base Station Device 10

The configuration of the base station device 10 of the present embodiment will be described with reference to FIG. 4. The base station device includes a beamforming setting information obtaining unit 101, a schedule information obtaining unit 102, a communication signal generation unit 104, a positioning reference signal generation unit 105, a multiplexing unit 108, and a transmission unit 106. The positioning reference signal generation unit 105 includes a reference signal format storage unit 103 and a weight multiplication unit 107. The multiplexing unit 108 is provided with a number corresponding to the number of antennas.

The beamforming setting information obtaining unit 101 "obtains" a plurality of beamforming setting information for generating a plurality of positioning reference signals transmitted from the transmission unit 106. The beamforming setting information is information for identifying a beam shape of the positioning reference signal transmitted from the transmission unit 106, and is information indicated by the transmission weight in the present embodiment. Of course, it may be identified by using other information. For example, it may be identified by the setting information of a physical phase device, an orientation of antenna elements, a relative position with respect to a reflecting object, and the like. Here, "obtain(s)" includes/means not only obtainment by receiving from other device(s) and obtaining it, but also obtainment by generating and obtaining by itself and obtainment by reading from its own storage device.

The beamforming setting information may be generated by the base station device 10 by itself, or may be received from other device(s). In the present embodiment, the beamforming setting information is obtained by receiving the one generated and transmitted by the reception map server device 30.

FIG. 5 is a specific example of the beamforming setting information of the present embodiment. The beamforming setting information includes a plurality of sets of beamforming settings, and each beamforming setting includes information on an identification ID, a base station ID, and a transmission weight. The identification ID is information that identifies a beamforming setting. The base station ID is information that identifies a base station device 10 that transmits the positioning reference signal generated based on the beamforming setting. The transmission weight is information indicating a weight to be multiplied by a pilot signal. Although the transmission weight is directly described in FIG. 5, any information may be used as long as the transmission weight can be specified.

The schedule information obtaining unit 102 obtains "schedule information" indicating a transmission schedule of a plurality of positioning reference signals. In the present embodiment, the schedule information is a "transmission period" or a "transmission time" of each of the plurality of positioning reference signals. The schedule information obtaining unit 102 is included in an upper hierarchy processing unit in the present embodiment. The upper hierarchy processing unit stores and obtains schedule information, processes communication data, and allocates communication resources. The "transmission period" includes not only a period between a start timing of transmission and an end timing of transmission directly or indirectly indicated, but also a start timing of transmission and a time length of transmission directly or indirectly indicated. It may also include a period of transmission by specifying/identifying a slot number, symbol number, etc. in a data frame. The "transmission time" may be any information that can specify a timing at which transmission is started in addition to a time at which transmission is started.

The schedule information may be generated by the base station device by itself, or may be received from other device. In the present embodiment, the schedule information is obtained (i.e., received) as the one generated and transmitted by the reception map server device 30.

FIG. 6 is a specific example of the schedule information of the present embodiment. In the present embodiment, the schedule information includes information on the identification ID of the schedule information, the base station ID, the symbol used indicating the transmission period, and the transmission time. The identification ID corresponds to the identification ID of the beamforming setting information of FIG. 5. The base station ID is information that identifies the base station device 10 to which the schedule information is applied. The symbol used is an example of a transmission period, and is information for identifying a symbol which is a position of a positioning reference signal in a data frame transmitted by the base station device 10. The transmission time is information that identifies the time when the positioning reference signal is transmitted.

In the present embodiment, both the symbol used and the transmission time are included in the schedule information, but either one may only be used.

The reference signal format storage unit 103 stores reference signal information (i.e., format) required for generating a reference signal. In the present embodiment, a pilot signal having a fixed value is used as a reference signal, but any signal can be used as long as it can be generated by the base station. For example, in a 3GPP cellular system, a signal known to both the terminal device and the base station device is used as a reference signal. The signal may be fixed, but also, signals made orthogonal to each other by using a sequence known to both the terminal device and the base station device, which is predetermined based on a physical cell identifier (PCI, cell ID) for identifying the base station device for reuse of resources for the reference signals may also be used. As a reference signal of the present disclosure, such a signal already implemented for other purposes may be divertingly used or a signal may be newly defined.

The communication signal generation unit 104 encodes data to be transmitted to generate a digital signal. When the schedule information is transmitted from the base station device 10 to the terminal device 20, the upper hierarchy processing unit determines a communication resource for accommodating the schedule information and reflects the accommodated data.

The positioning reference signal generation unit 105 generates a plurality of positioning reference signals by using each of the plurality of beamforming setting information. Specifically, the weight multiplication unit 107 of the positioning reference signal generation unit 105 multiplies a reference signal generated based on the reference signal information obtained from the reference signal format storage unit 103 by the transmission weight obtained by the beamforming setting information obtaining unit 101.

The multiplexing unit 108 assigns the communication signal (optionally including the identification ID of the beamforming setting information and the signal for transmitting the corresponding schedule information) and the positioning reference signal generated by the communication signal generation unit 104, respectively to the communication resource determined by the upper hierarchy processing unit.

By setting the transmission weight for an input signal to each antenna, the beam shape formed by the entire antenna can be adjusted. For example, the directivity can be expanded/widened by lowering an amplitude value of the transmission weight corresponding to the antennas at both ends and increasing an amplitude value of the transmission weight corresponding to the central antenna among the plurality of antennas. Alternatively, the beam direction can be changed by setting the transmission weight so as to change the phase of the input signal to each antenna.

Figure 4:
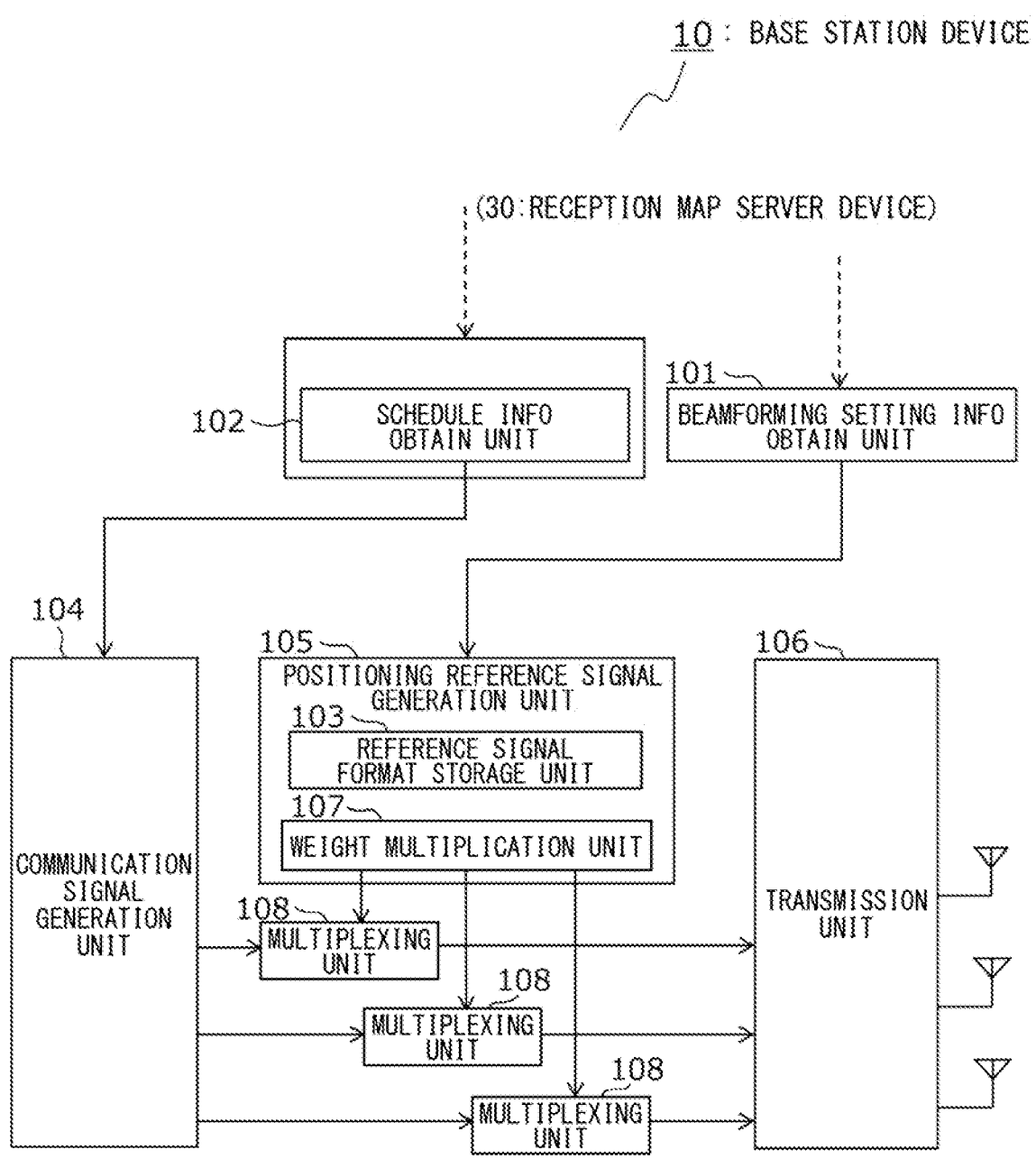
FIG. 4 is a block diagram showing a configuration example of a base station device according to the embodiment of the present disclosure.

In FIG. 4, there are three antennas and three multiplexing units 108, but the number may be less than three or more than three.

The transmission unit 106 inversely Fourier-converts the digital signal in which the communication signal and the positioning reference signal are multiplexed, which is output from the multiplexing unit 108, to generate a baseband OFDM signal, which is further converted into an analog signal, and is up-converted to a carrier frequency to generate an RF signal, and the generated RF signal is output to the antenna for transmission.

(2) Specific Example of Transmission of Positioning Reference Signal

Figure 7A:
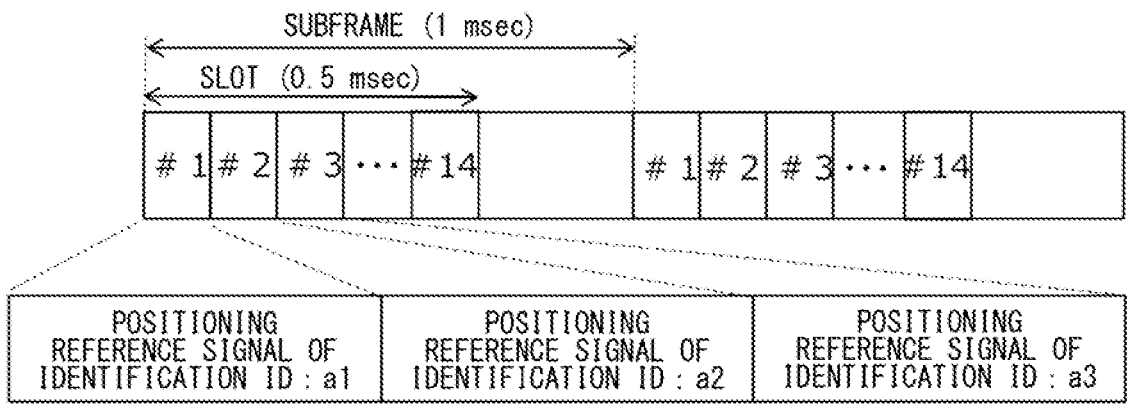
FIGS. 7A, 7B and 7C are, respectively, an explanatory diagram illustrating a positioning reference signal according to the embodiment of the present disclosure.
Figure 7B:
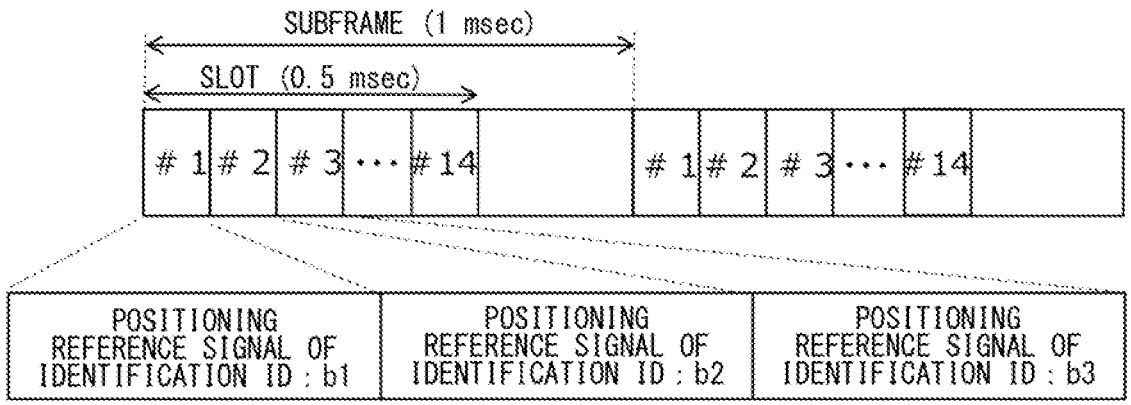
Figure 7C:
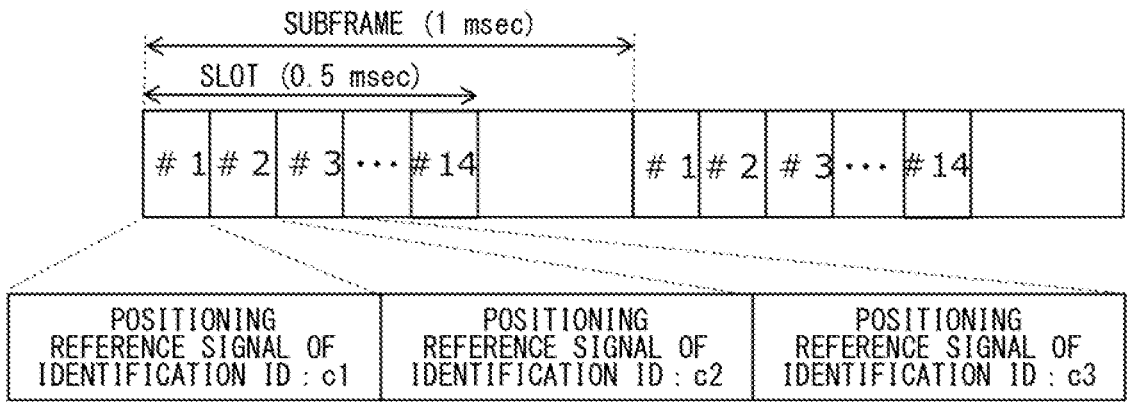

The details of the positioning reference signal will be described with reference to FIGS. 7A/7B/7C and 8A/8B/8C. First, the transmission period of the positioning reference signal at a subchannel will be described with reference to FIGS. 7A, 7B, and 7C. FIGS. 7A, 7B, and 7C are, respectively, explanatory diagrams of transmission timing of a positioning reference signal in a data frame transmitted by a base station device 10a, a base station device 10b, and a base station device 10c. The transmission period here is a symbol position or/and a slot position in a data frame. Such arrangement of the positioning reference signal is made by the upper hierarchy processing unit. The one or more subchannels to convey positioning reference signal may be pre-determined or dynamically assigned. In the latter case, subchannel information is included in the schedule information.

The data frame transmitted by the base station device 10a shown in FIG. 7A is composed of a sequence of subframes having a fixed data period as one unit. Subframes are further composed of one or more slots. In the present embodiment, following the NR (New Radio) of 3GPP, the subframe is composed of 1 msec, the slot in the subframe is composed of 0.5 msec, and one slot is composed of 14 symbols (when the subcarrier interval is 30 kHz).

The positioning reference signal is repeatedly transmitted according to a subframe cycle. In FIG. 7A, the positioning reference signal is repeatedly transmitted at a cycle of 1 msec. However, the positioning reference signal does not have to be transmitted in all subframes or all slots.

Further, the base station device 10a transmits a positioning reference signal having three types of beamforming settings whose identification IDs are a1 to a3, based on the beamforming setting information shown in FIG. 5, in one subframe. Further, based on the symbols used in the schedule information shown in FIG. 6, three types of positioning reference signals having identification IDs a1 to a3 are assigned to three consecutive symbols, symbol #1, symbol #2, and symbol #3. In the case of FIG. 7A, each of the three types of positioning reference signals is transmitted while switching at ⅟28 msec (0.5 msec/14).

As shown in FIGS. 7B and 7C, the base station device 10b and the base station device 10c also have a positioning reference signal and a symbol used respectively to be transmitted being set based on the beam forming setting information and the schedule information as in the case of the base station device 10a. That is, three types of positioning reference signals having identification IDs b1 to b3 and c1 to c3 are assigned to the symbols in the slot.

In the base station device 10a, based on the transmission time of the schedule information shown in FIG. 6, a positioning reference signal having three types of beam forming settings with identification IDs a1 to a3 is transmitted from 8:00 am, and the same having three types of beam forming settings with identification IDs a4 to a6 are transmitted from 9:00 am, positioning reference signals by using symbol #1, symbol #2, and symbol #3. The same applies to the base station device 10b and to the base station device 10c.

The number of symbols and slots to be used may change according to the transmission time of the schedule information. For example, in FIGS. 7A, 7B, and 7C, three symbols are used, but two or four or more symbols may also be used. Also, it is not always necessary to use symbols or slots for each subframe. For example, one symbol may be used once every 5 subframes. For example, in the morning or evening time when traffic congestion is expected, the frequency of the positioning reference signal to be transmitted may be reduced by lengthening the cycle of the symbols and slots used. Since the moving speed of the vehicle is slow during the traffic congestion, a sample density in the time direction required for collation with the reception radio wave map can be small. Then, by diverting the surplus resources to communication resources, it becomes possible to effectively use radio waves. Further, different positioning reference signals may be transmitted for each/every slot or subframe with the same symbol.

Figure 8A:
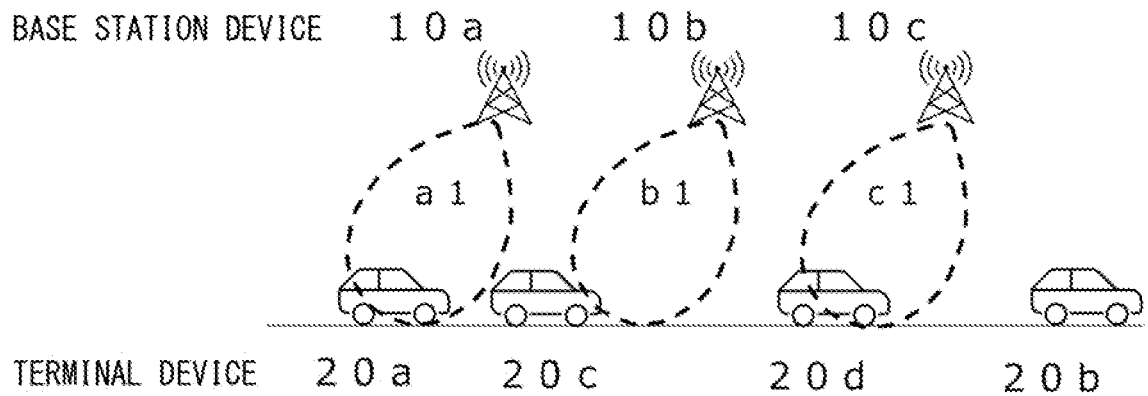
FIGS. 8A, 8B and 8C are, respectively, an explanatory diagram illustrating a state in which a base station device transmits a positioning reference signal to a terminal device.
Figure 8B:
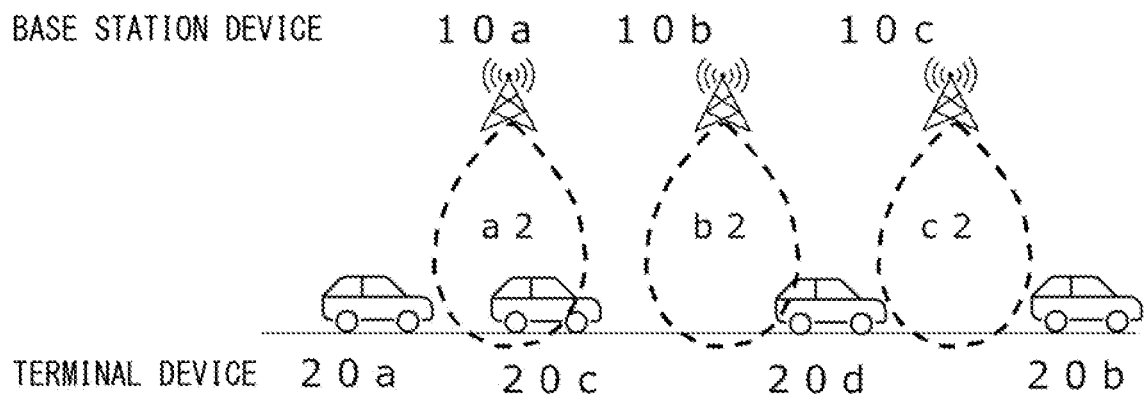
Figure 8C:
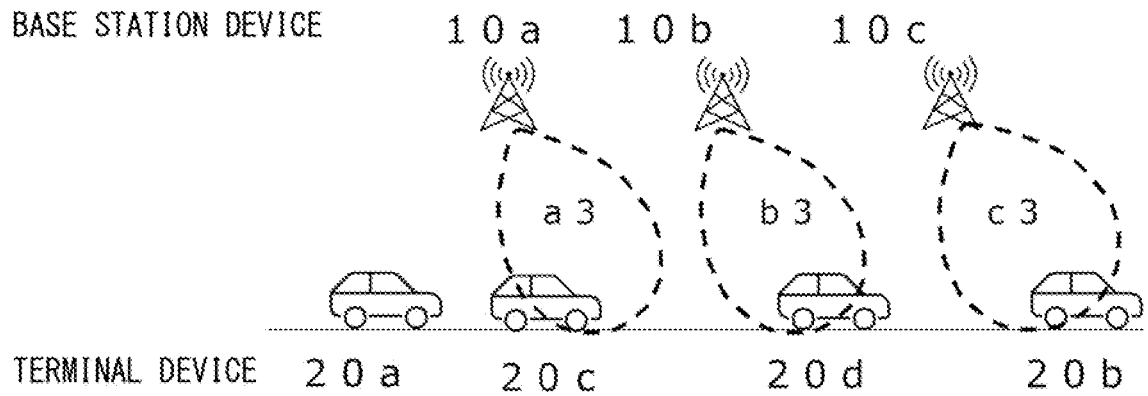

Next, the positioning reference signal transmitted in each transmission period will be described with reference to FIGS. 8A/8B/8C. In FIGS. 8A to 8C, how a positioning reference signal is transmitted from the base station device 10 is shown as: the top row (i.e., 8A) at a timing of the symbol #1, the middle row (i.e., 8B) at a timing of the symbol #2, and the bottom row at a timing of the symbol #3.

As to symbol #1, the base station device 10a transmits a positioning reference signal with an identification ID of a1, the base station device 10b transmits a positioning reference signal with an identification ID of b1, and the base station device 10c transmits a positioning reference signal with an identification ID of c1.

As a result, different positioning reference signals are transmitted from each of the base station devices 10 at the timing of the same symbol.

As to the symbol #2, each of the base station devices 10 transmits a positioning reference signal having a beamforming setting different from the positioning reference signal of the symbol #1. The same applies to symbol #3.

As a result, each of the base station devices 10 can transmit a positioning reference signal having a different beamforming setting for each symbol. Thus, as shown in FIGS. 8A, 8B, and 8C, each of the base station devices 10 can transmit the positioning reference signals to a wider range, by changing the beamforming setting to generate the positioning reference signal. Alternatively, multiple positioning reference signals with different beamforming settings can be transmitted to the same range.

In each positioning reference signal transmitted in FIGS. 8A, 8B, and 8C, symbol #1, symbol #2, and symbol #3 are switched every at ⅟28 msec (0.5 msec/14) and repeated at a cycle of 1 msec, as described above.

For example, the terminal device 20a can receive a positioning reference signal having an identification ID a1 at least from the base station device 10a at the timing of the symbol #1. The terminal device 20b can receive a positioning reference signal having an identification ID c3 at least from the base station device 10c at the timing of the symbol #3. In such manner, since a positioning reference signal having a different beamforming setting is transmitted for each symbol, the terminal device 20a and the terminal device 20b can respectively have an opportunity to receive a positioning reference signal.

For example, the terminal device 20c can receive a positioning reference signal having an identification ID a2 and an identification ID a3 from the base station device 10a at the timing of the symbol #2 and the symbol #3. The terminal device 20d can receive a positioning reference signal having an identification ID of c1 from the base station device 10c at the timing of symbol #1, and can receive a positioning reference signal having an identification ID of b3 from the base station device 10b at the timing of symbol #3. In such manner, since each of the base station devices 10 transmits a positioning reference signal having a different beam forming setting for each of the symbols, the terminal device 20c and the terminal device 20d can receive a plurality of positioning reference signals transmitted from the same base station device 10 or from different base station devices 10. Then, positioning is performable using a positioning reference signal having a better reception status and/or all available/receivable positioning reference signals.

Further, each of the terminal devices 20 can receive the same positioning reference signal at a fixed cycle of, for example, 1 msec.

Further, the transmission period of a positioning reference signal output from respective base station devices 10 needs not be synchronized. For example, in FIGS. 7A, 7B, and 7C, the symbols of the base station device 10a, the base station device 10b, and the base station device 10c do not have to be synchronized.

(3) Specific Example of Transmission of Schedule Information

The schedule information is information required for the base station device 10 to transmit the positioning reference signal, and is also information required for the terminal device 20 to identify/distinguish a plurality of positioning reference signals. The terminal device 20 may obtain the schedule information from any device, but here, a case where the base station device 10 transmits the schedule information to the terminal device 20 will be described.

Figure 9A:
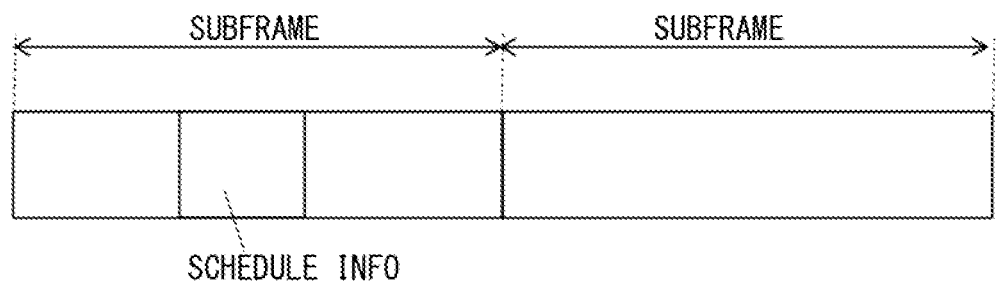
FIGS. 9A and 9B are, respectively, an explanatory diagram illustrating a state in which the base station device transmits schedule information to the terminal device.

FIG. 9A is a frame transmitted by a base station device 10.

When the schedule information is transmitted using a physical layer of such wireless frame, for example, in the NR radio standard of 3GPP, PBCH (Physical Broadcast Channel) can be used when the same information is transmitted to all terminals. On the other hand, when notifying a specific user, PDSCH (Physical Downlink Shared CHannel) or the like can be used. Alternatively, the notification can also be made by using a signaling means such as RRC (Radio Resource Control) or MAC-CE (MAC Control Element) of a higher layer/hierarchy.

The schedule information to be transmitted is, for example, schedule information as shown in FIG. 6. Note that FIG. 6 shows the schedule information of the positioning reference signal transmitted by the base station device 10*a*. In addition to the schedule information of the positioning reference signal transmitted by the base station device 10*a* itself, the base station device 10*a* may also transmit the schedule information of an adjacent base station device 10, or the schedule information of the base station device 10 within a predetermined range therefrom may be transmitted.

Figure 9B:
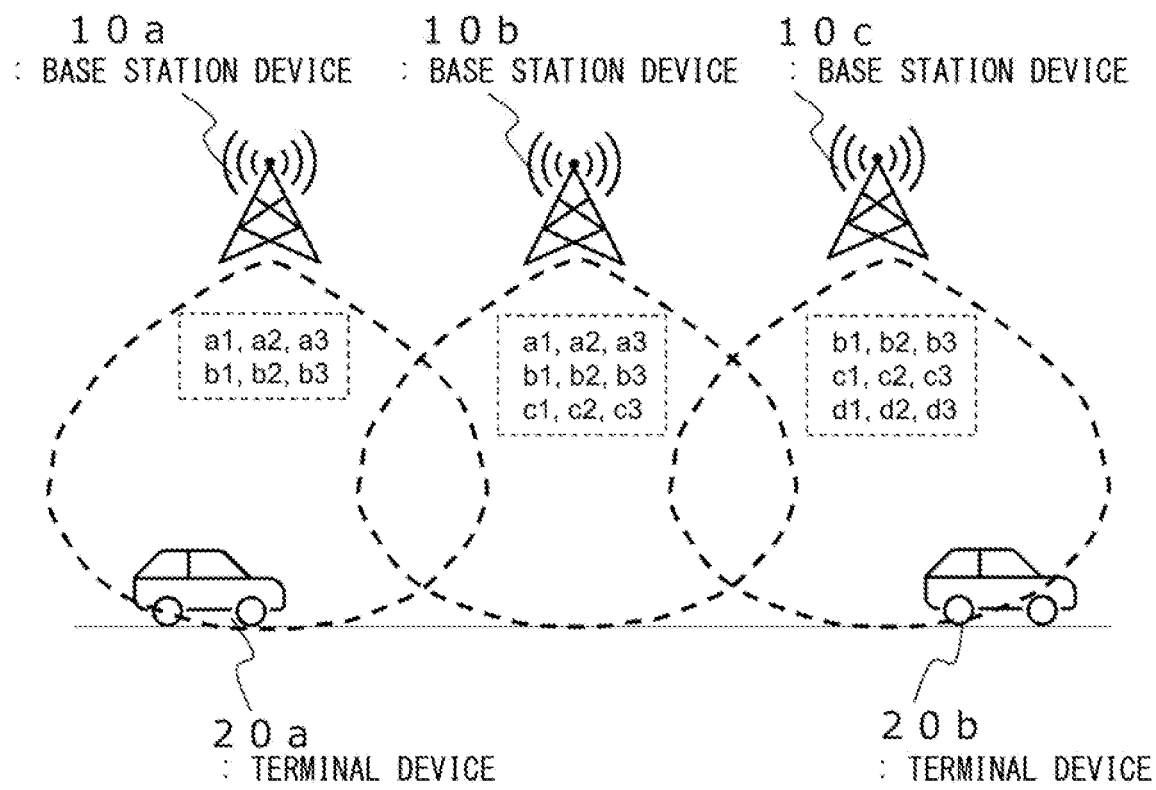

FIG. 9B shows how the base station device 10*a*, the base station device 10*b*, and the base station device 10*c* respectively transmit the schedule information. In the drawing, the schedule information is described by the identification IDs. Each of the base station devices 10 transmits the schedule information of the positioning reference signal transmitted by itself, and in addition, transmits the schedule information of the positioning reference signal transmitted by the adjacent base station device(s) 10. By transmitting the schedule information of the positioning reference signal of the adjacent base station device(s) 10 in such manner, the terminal device 20 can predict the positioning reference signal to be received in the future.

Of the schedule information shown in FIG. 6, the transmission time does not have to be transmitted. The terminal device 20 can receive a positioning reference signal without knowing the transmission time.

(4) Summary

As described above, according to the base station device 10 of the present embodiment, since a plurality of positioning reference signals using a plurality of beamforming settings are transmitted, the range/choice of positioning reference signals that can be used by the terminal device 20 is widened, thereby the positioning accuracy of the terminal device 20 can be improved. Further, in the terminal device 20, a positioning reference signal having good positioning accuracy can be selected and used from among a plurality of positioning reference signals.

3. Details 2: Terminal Device 20

Figure 10:
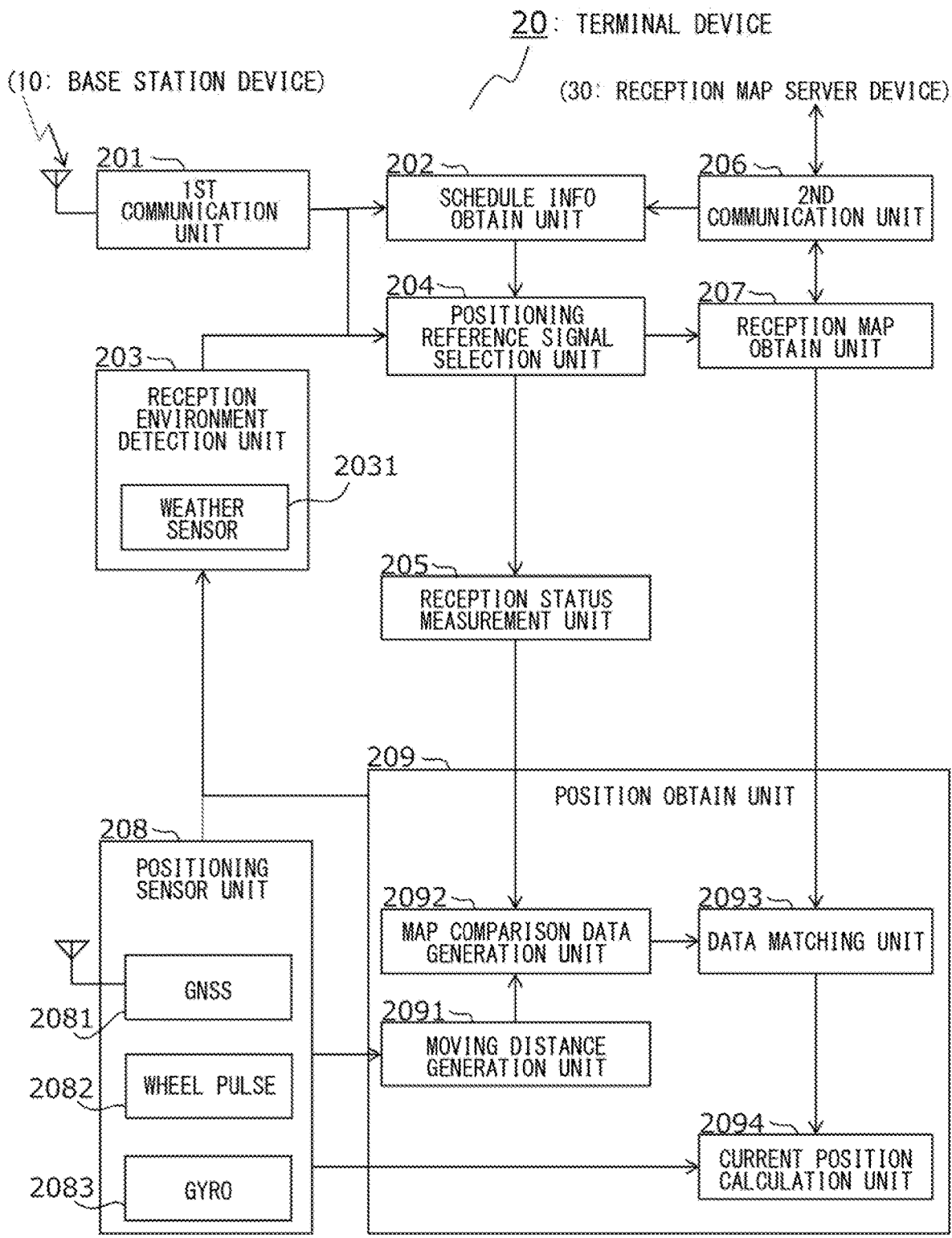
FIG. 10 is a block diagram showing a configuration example of the terminal device according to the embodiment of the present disclosure.

A specific configuration of the terminal device 20 of the present embodiment will be described with reference to FIG. 10. The terminal device 20 includes a first communication unit 201, a schedule information obtaining unit 202, a reception environment detection unit 203, a positioning reference signal selection unit 204, a reception status measurement unit 205, a second communication unit 206, a reception map obtaining unit 207, a positioning sensor unit 208, and a position obtaining unit 209.

The first communication unit 201 performs wireless communication with the base station device 10 and receives a plurality of positioning reference signals from the base station device 10.

The schedule information obtaining unit 202 "obtains" schedule information indicating the transmission schedule of a positioning reference signal. When the schedule information is transmitted from the base station device 10, the schedule information is obtained via the first communication unit 201. When the schedule information is transmitted from the reception map server device 30, the schedule information is obtained via the second communication unit 206. Here, "obtain(s)" includes/means not only obtainment by receiving from other device(s) and obtaining it, but also obtainment by generating and obtaining by itself and obtainment by reading from its own storage device.

The reception environment detection unit 203 obtains the reception environment around the terminal device 20. Examples of the reception environment include weather conditions, terrain conditions, road conditions, and movement conditions of the terminal device 20. For example, a weather sensor 2031 included in the reception environment detection unit 203 detects weather conditions such as sunny weather, rainy weather, and snowfall by detecting raindrops, temperature, humidity, and sunlight.

Further, the reception environment detection unit 203 may obtain the current approximate position of the terminal device 20 from the position obtaining unit 209 or the positioning sensor unit 208, which will be described later, as the movement status of the terminal device 20. For example, it may be latitude/longitude information as a rough area of several km square, or information such as a road on which the vehicle is traveling.

The positioning reference signal selection unit 204 refers to the schedule information obtained by the schedule information obtaining unit 202, and selects a positioning reference signal or signals used by the terminal device 20 from among the plurality of positioning reference signals. An example of the selection method is to select a positioning reference signal having a highest average reception intensity for a certain period immediately before the selection. Further, note that a positioning reference signal used by the terminal device 20 may be selected based on the detection result of the reception environment detection unit 203. Further, the positioning reference signal selection unit 204 may select a plurality of positioning reference signals.

The reception status measurement unit 205 measures a reception status of the selected positioning reference signal. The reception status may be an index that is the same as the state or the estimation result of the reception radio wave propagation path used in the reception radio wave map. For example, a reception intensity is used as an index indicating a reception status.

The second communication unit 206 communicates with the reception map server device 30 and receives the reception radio wave map from the reception map server device 30. For example, a reception radio wave map request is transmitted to the reception map server device 30, and the reception radio wave map corresponding to the request is received from the reception map server device 30. Alternatively, a reception radio wave map broadcast and transmitted from the reception map server device 30 at regular intervals may be received. When receiving the schedule information from the reception map server device 30, the second communication unit 206 receives the schedule information. The details of the reception radio wave map will be described in the section of the reception map server device 30.

The first communication unit 201 and the second communication unit 206 may use different communication methods or may use the same communication method. Further, when the same communication method is used by the two, they may be physically one communication unit.

The reception map obtaining unit 207 obtains a reception radio wave map corresponding to the positioning reference signal selected by the positioning reference signal selection unit 204. Specifically, the reception map obtaining unit 207 transmits a request for the reception radio wave map corresponding to the selected positioning reference signal to the reception map server device 30 via the second communication unit 206. When the reception radio wave map transmitted by broadcasting is received, it may be obtained by selecting the reception radio wave map selected/identified by the positioning reference signal selection unit 204. The reception radio wave map that has already been received may be obtained by reading it from a memory (not shown in the drawing).

The positioning sensor unit 208 includes a plurality of sensors for obtaining a position, a travel locus, and a travel distance of the terminal device 20. For example, when radio waves from a plurality of positioning satellites are received by a GNSS 2081, an absolute position of the terminal device 20 is detected. Since a wheel pulse 2082 outputs a pulse based on the rotation of the wheel, a moving distance of the terminal device 20 can be obtained by counting the pulse. Since a gyro 2083 can detect an angular velocity due to the rotational move of the terminal device 20, an angle can be obtained by integrating such values.

The position obtaining unit 209 obtains the position of the terminal device based on a measurement result of the reception status measurement unit 205 and the reception radio wave map obtained by the reception map obtaining unit 207. Hereinafter, a specific description will be given.

The position obtaining unit 209 includes a moving distance generation unit 2091, a map comparison data generation unit 2092, a data matching unit 2093, and a current position calculation unit 2094. The position obtaining unit 209 performs positioning, as described in the section "1. (3)". i.e., positioning according to the reception intensity measurement pattern accompanying the movement or positioning according to the reception intensity measurement pattern at a plurality of frequencies.

The moving distance generation unit 2091 obtains the moving distance of the vehicle based on the output of the positioning sensor unit 208. For example, a pulse of the wheel pulse 2082 is counted to obtain a moving distance starting from a certain point.

The map comparison data generation unit 2092 generates map comparison data for comparison with the reception radio wave map. For example, from the reception intensity measured by the reception status measurement unit 205 and the moving distance obtained from the moving distance generation unit 2091, the reception intensity measurement pattern accompanying the movement as shown in FIG. 3A is obtained. Alternatively, the reception intensity measurement pattern at a plurality of frequencies as shown in FIG. 3B is obtained by the reception status measurement unit 205 from the reception intensity measured for each of the frequencies. In such case, it is optional to use an output of the moving distance generation unit 2091.

The data matching unit 2093 performs positioning by comparing the map comparison data and the reception radio wave map, and obtains a position of the terminal device 20. Specifically, as shown in FIGS. 3A and 3B, the reception radio wave map is pattern-matched with the reception intensity measurement pattern accompanying the movement or the reception intensity measurement pattern at a plurality of frequencies.

The current position calculation unit 2094 obtains a current position of the terminal device 20 based on the position of the terminal device 20 obtained by the data matching unit 2093 and the position of the terminal device 20 obtained by the positioning sensor unit 208. For example, when the GNSS 2081 receives a radio wave of a positioning satellite and obtains a latest absolute position of the terminal device 20, the current position calculation unit 2094 sets the obtained position as a current position of the terminal device 20. When the GNSS 2081 cannot receive a radio wave of any positioning satellite, the current position calculation unit 2094 sets the position of the terminal device 20 obtained by the data matching unit 2093 as a current position of the terminal device 20.

The current position calculation unit 2094 may obtain the current position of the terminal device 20 by obtaining a weighted average of the positions obtained by the GNSS 2081 and the position obtained by the data matching unit 2093 with appropriate weighting.

When the positioning reference signal selection unit 204 selects a plurality of positioning reference signals, the position obtaining unit 209 may obtain the position based on the measurement result of each positioning reference signal obtained from the reception status measurement unit 205 and the reception radio wave map of each positioning reference signal. For example, from among the respective positioning reference signals, a positioning result by the most reliable positioning reference signal may be adopted. Alternatively, a value obtained by performing a predetermined calculation, for example, averaging, weighted averaging, differentiation, binarization, or the like, may be used for processing the positioning result of each positioning reference signal.

From the above configuration, according to the terminal device 20 of the present embodiment, the current position of the terminal device 20 is obtainable using a positioning reference signal selected from the plurality of positioning reference signals. Therefore, the terminal device 20 can have a wider range/choices of positioning reference signals available for use. As a result, an area in which the terminal device 20 can perform positioning is expandable. Moreover, the accuracy of positioning of the terminal device 20 can be improved. Further, according to the terminal device 20 of the present embodiment, the current position of the terminal device 20 is obtainable even when the GNSS 2081 cannot receive a signal from the positioning satellite. Further, since the terminal device of the present embodiment can use information of both the position obtained by the GNSS 2081 and the position obtained by the data matching unit 2093, the current position of the terminal device 20 can be obtained with higher accuracy.

4. Details 3: Reception Map Server Device 30

(1) Configuration of Reception Map Server Device 30

The reception map server device 30 is a device that provides/delivers a reception radio wave map to the terminal device 20. In addition, in the present embodiment, the reception map server device 30 generates beamforming setting information used by the base station device 10 to generate a positioning reference signal based on the reception radio wave map, and transmits the beamforming setting information to the base station device 10. Further, in the present embodiment, the reception map server device 30 generates schedule information indicating a transmission schedule for transmitting the positioning reference signal by the base station device 10 based on the reception radio wave map, and transmits the generated schedule information to the base station device 10. In the present embodiment, the beamforming setting information and the schedule information are generated by the reception map server device 30. However, such an example is modifiable, and the information may be generated by the base station device 20 or other device(s). Further, in the present embodiment, beamforming setting information and schedule information are generated based on the information of the reception radio wave map, but this is an example and they may also be generated based on other information.

Figure 11:
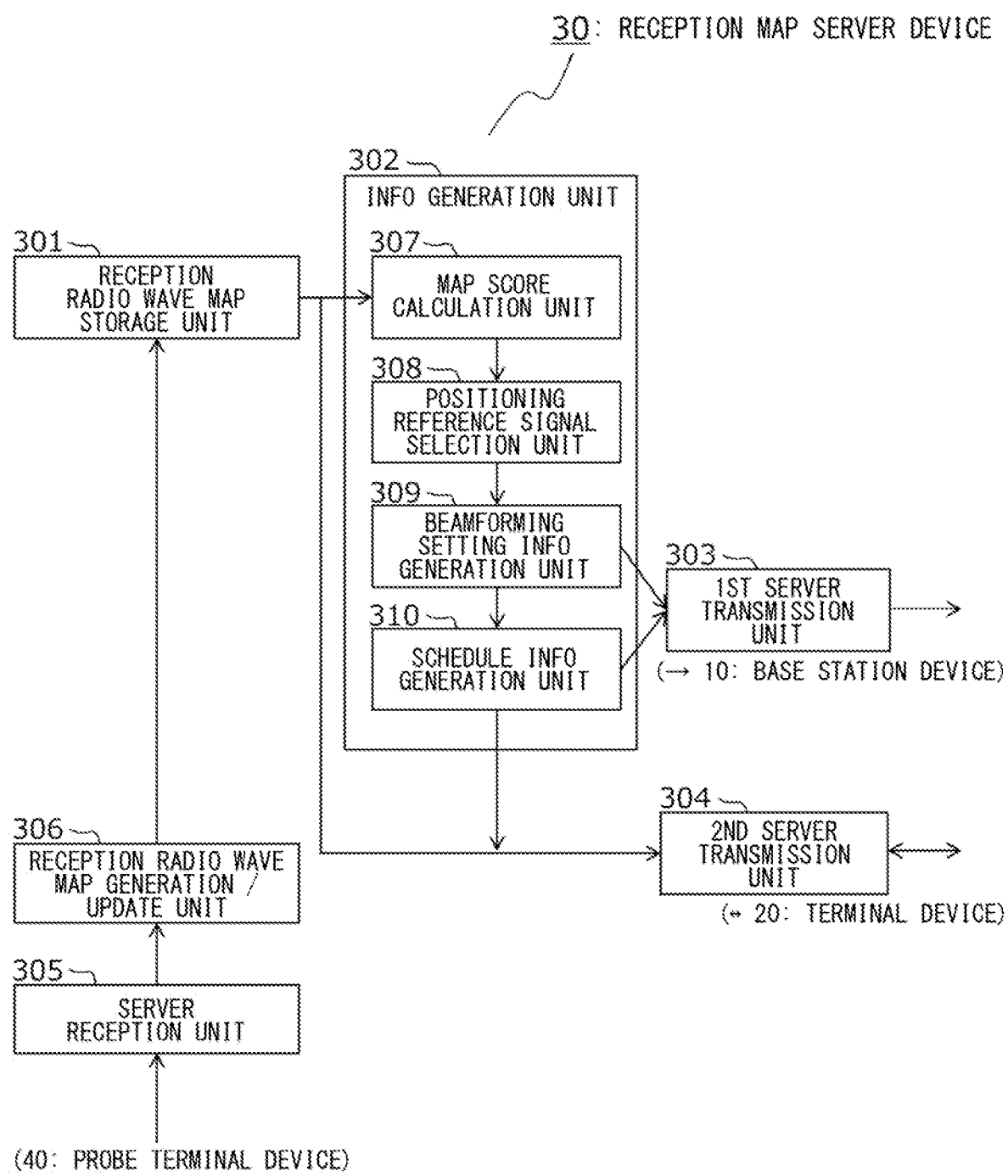
FIG. 11 is a block diagram showing a configuration example of a reception map server device according to the embodiment of the present disclosure.

The configuration of the reception map server device 30 of the present embodiment will be described with reference to FIG. 11. The reception map server device 30 includes, i.e., is composed of, a reception radio wave map storage unit 301, an information generation unit 302, a first server transmission unit 303, a second server transmission unit 304, a server reception unit 305, and a reception radio wave map generation/update unit 306.

In the present embodiment, the reception map server device 30 is assumed to be in a form of a server device as a finished product, but the present disclosure is not limited to such configuration. For example, the reception map server device 30 may come in a form of a component including a semiconductor circuit or a semiconductor module, in a form of a semi-finished product such as an ECU, or in a form of a finished product such as a personal computer (PC), a workstation, a smartphone, or a mobile phone. Further, it may be a virtual machine on a server virtualization environment instead of a physical device.

Further, the reception map server device 30 may be mounted on a mobile body. When the reception map server device 30 is mounted on a mobile body, it is realized in/as vehicle-to-vehicle communication in which vehicles directly communicate with each other or in/as vehicle-to-vehicle communication in which vehicles indirectly communicate with each other via a base station device 10 or the like.

The reception radio wave map storage unit 301 stores, for each of the positioning reference signals which are signals used by the terminal device 20 to estimate its own position, (i) an identified position and (ii) a reception radio wave map associated with a state or an estimation result of a reception radio wave propagation path of the positioning reference signal at the identified position. The reception radio wave map maps, for example, an expected reception state for each of the grid points on the map or on the road. Further, a state of the radio wave propagation path at a different frequency or frequencies for each of the identified positions or a set of estimation results thereof may be added thereto. For example, it may include a mapping of the state of the radio wave propagation path for each of a plurality of channels that are different subcarriers.

As an index showing the reception state, for example, in addition to the reception intensity and phase for each subchannel, comprehensive indexes for a plurality of subchannels are used, such as RSSI (Received Signal Strength Indicator), RSRP (Reference Signal Received Power), RSRQ (Reference Signal Received Quality), Reference Signal Received Quality), SNR (Signal to Noise Ratio), SIR (Signal to Interference Ratio), BER (Bit Error Rate), CNR (Carrier to Noise Ratio), propagation delay, arrival/incident direction, and the like. In the description of the present embodiment, the reception intensity is used as an index indicating a reception state, but it is not intended to limit the index to such indicator.

The information generation unit 302 generates beamforming setting information indicating a beamforming setting of the positioning reference signal to be transmitted by the base station device 10 in future based on the reception radio wave map stored in the reception radio wave map storage unit 301. Further, the information generation unit 302 generates schedule information indicating the transmission schedule of the positioning reference signal to be transmitted by the base station device 10 in future based on the reception radio wave map stored in the reception radio wave map storage unit 301. These details will be described later in (3).

The first server transmission unit 303 transmits beamforming setting information generated by the information generation unit 302 to the base station device 10. Further, the schedule information generated by the information generation unit 302 may also be transmitted to the base station device 10.

Based on a request from the terminal device 20, the second server transmission unit 304 transmits, to the terminal device 20, a reception radio wave map corresponding to a requested positioning reference signal. Further, the schedule information generated by the information generation unit 302 may also be transmitted to the terminal device 20.

A request from the terminal device 20 is to request a reception radio wave map corresponding to a positioning reference signal specified/identified on a terminal device 20 side. Specifically, as a request from the terminal device 20, an identification ID of the corresponding positioning reference signal is sent to the reception map server device 30. In such case, the second server transmission unit 304 transmits a reception radio wave map corresponding to the positioning reference signal of the relevant identification ID to the terminal device 20. The second server transmission unit 304 may spontaneously and periodically transmit a reception radio wave map corresponding to all the positioning reference signals to the terminal device 20 without being based on a request from the terminal device 20.

The server reception unit 305 receives probe data from the probe terminal device 40.

The reception radio wave map generation/update unit 306 newly generates or updates the reception radio wave map based on the probe data.

(2) Reception Radio Wave Map Stored in the Reception Radio Wave Map Storage Unit 301

The reception radio wave map storage unit 301 stores a reception radio wave map for each of road areas, e.g., for a road area at intervals of 3 km on the road. Further, the reception radio wave map storage unit 301 stores a plurality of reception radio wave maps under two parameters, i.e., (i) by using a road area as one parameter and (ii) by further using identification information of the beamforming setting of the positioning reference signal in the same road area as the other parameter.

Further, the reception radio wave map storage unit 301 may store the reception radio wave map for each of the reception environments by using the reception environment as a parameter. The reception environment includes at least one of "weather condition", "road condition", and "movement condition of the terminal device 20". Here, the "weather condition" includes, for example, measurement values related to weather conditions such as sunny weather, rainy weather, and snowfall, as well as weather conditions such as rainfall, snowfall, temperature, humidity, wind speed and the like. Further, the "weather condition" is not limited to the current condition, but may include a predicted condition in the near future, for example. The "road condition" includes, for example, road surface conditions such as paved and unpaved roads, the presence or absence of street trees, road vicinity conditions such as under-elevated roads, as well as road congestion, construction, and other road-related matters and other vehicles including a situation involving them. The "movement condition of the terminal device" includes, in addition to an approximate position of the terminal device, when the terminal device is mounted on a mobile body, for example, movement characteristics such as movement speed and movement direction, and a lane in which the terminal device is traveling, including a position of the terminal device with respect to the road.

For example, the reception radio wave maps are separately saved in advance by classifying the weather conditions into at least general weather conditions such as sunny weather, rainy weather, snowfall and the like. Even if the reception intensity fluctuates due to the absorption of radio waves by the moisture in the air, it is possible to provide a reception radio wave map corresponding to such fluctuation.

For example, as for two road conditions, the reception radio wave maps are separately stored in advance for a road congested situation and a road non-congested situation.

Even if the reception intensity fluctuates due to the increase or decrease of vehicles according to road congestion, it is possible to provide a reception radio wave map corresponding to the fluctuation.

For example, as the movement status of the terminal device 20, the reception radio wave map is separately saved for each moving speed range in advance. The moving speed range means a speed range in which an upper limit speed, a lower limit speed, or at least one of them is defined. (It is possible to provide a reception radio wave map corresponding to the moving speed range at which the terminal device 20 is traveling. It is possible to provide a reception radio wave map corresponding to or accommodating (i) fluctuations in the posture of the vehicle body and (ii) fluctuations in the amount of influence of Doppler shift or time-selective phasing on the received signal.

(3) Details of Configuration of the Information Generation Unit 302

The information generation unit 302 includes, i.e., is composed of, a map score calculation unit 307, a positioning reference signal selection unit 308, and a beamforming setting information generation unit 309. The information generation unit 302 may further include a schedule information generation unit 310.

The map score calculation unit 307 calculates a map score based on the reception radio wave map stored in the reception radio wave map storage unit 301. Since a plurality of reception radio wave maps are usually stored in the reception radio wave map storage unit 301, a map score is calculated for each of the plurality of reception radio wave maps. The map score is an evaluation value determined from the position accuracy and reliability when the reception radio wave map is used for positioning. The higher the map score of a map is, the higher such map is expected to have a positioning accuracy. Therefore, an evaluation based on the map score corresponds to an evaluation of an expected estimation accuracy.

Figure 12A:
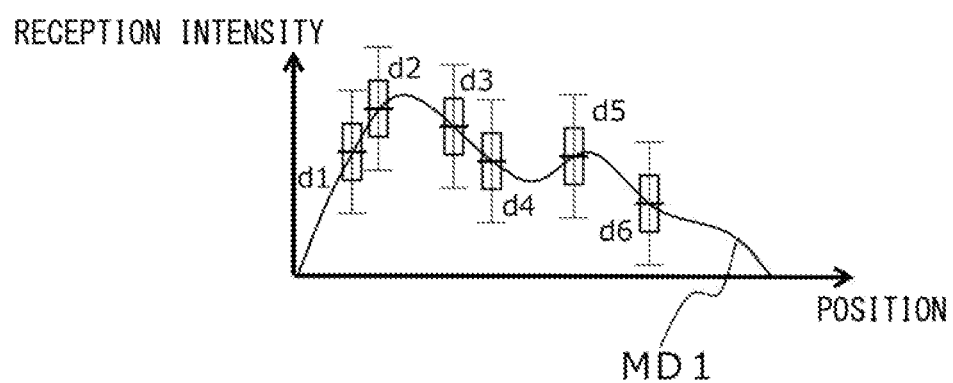
FIGS. 12A and 12B are, respectively, an explanatory diagram illustrating an example of a map score according to the embodiment of the present disclosure.
Figure 12B:
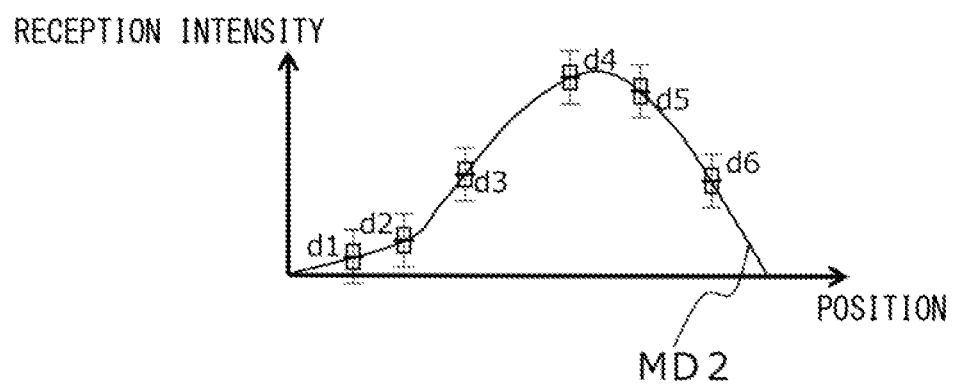

An example of a map score will be described with reference to FIGS. 12A and 12B and FIGS. 13A and 13B. FIGS. 12A and 12B respectively show a relationship between (i) probe data for one of two types of positioning reference signals having different beamforming settings obtained for the same road area and (ii) a reception radio wave map generated using the probe data. The horizontal axis is a position on the road, and the vertical axis is a reception intensity. The probe data is assumed to be obtained from a plurality of probe vehicles, and a range of variation is shown in a box plot. The reception radio wave map is generated by the reception radio wave map generation/ update unit 306 using the probe data received from the probe terminal device 40 by the server reception unit 305. MD1 and MD2 are curves of the reception radio wave map obtained by regression of these probe data. di (i=1 to 6) is a difference between probe data having the largest deviation at each point and the reception radio wave map.

In examples of FIGS. 12A and 12B, the variation in FIG. 12B is smaller than that of FIG. 12A, thus it can be said that the positioning using reception radio wave map MD2 is more reliable than the positioning using the reception radio wave map MD1, and higher positioning accuracy is expected from the map MD2. For example, Score1 which is a score in the above examples can be calculated by the following Equation 1.

$$\text{Score1} = \frac{1}{\frac{\sum_{k=1}^{n} |d_k|}{n}} \quad \text{(Equation 1)}$$

In the Equation 1, n is the number of samples.

Figure 13A:
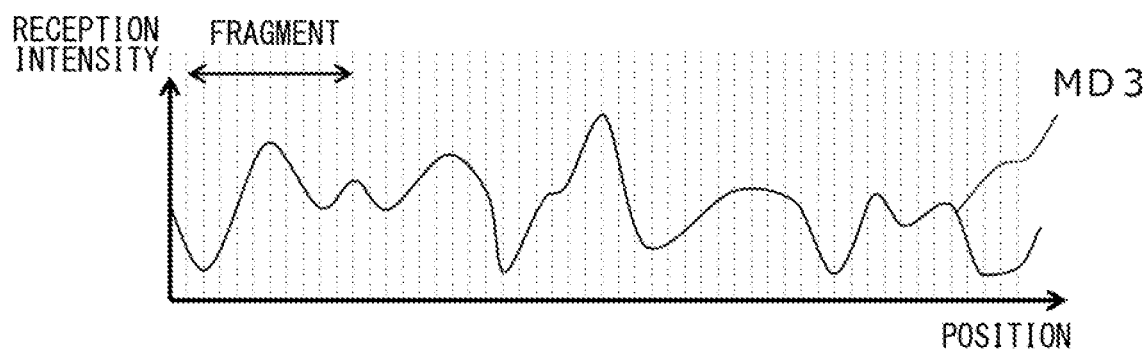
FIGS. 13A and 13B are, respectively, an explanatory diagram illustrating another example of the map score according to the embodiment of the present disclosure.
Figure 13B:
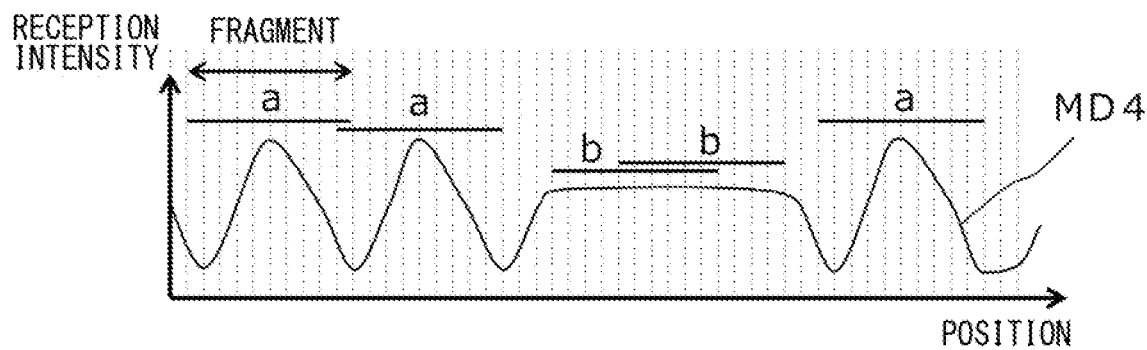

FIGS. 13A and 13B respectively show a reception radio wave map of one of two types of positioning reference signals obtained for the same road area and based on different beamforming settings. The horizontal axis is a position on the road, and the vertical axis is a reception intensity. MD3 and MD4 are reception radio wave maps. Then, in MD3 and MD4, a fragment from an arbitrary point having a predetermined distance can be conceived/conceptualized corresponding to the road area. In the example of FIGS. 13A and 13B, the reception radio wave map is divided into sub-areas at equal intervals, and a portion of the reception radio wave map corresponding to 10 sub-areas is considered one fragment. The length of the sub-area and the fragment length, which is the length of one fragment, can be arbitrarily set.

In a reception radio wave map shown by MD3, since the shapes of the fragments starting from any sub-area are not similar to each other/one another, errors are unlikely to occur in pattern matching. On the other hand, in a reception radio wave map shown by MD4, fragments having the same/ similar shape appear everywhere. For example, the shapes of the fragments shown by 'a' and the shapes of the fragments shown by 'b' are similar, thereby more likely to cause errors in pattern matching. Therefore, higher positioning accuracy can be expected by positioning using MD3 than by positioning using MD4.

The following example can be given as a method of calculating Score2 which is a score in such (above-described) case. First, the minimum Euclidean distance of a trace between any two fragments having a predetermined fragment length can be set as Score 2. Secondly, by determining an allowable minimum value of the Euclidean distance between the two traces, a reciprocal of a shortest fragment length exceeding such minimum value can be set as Score2.

For example, the map score calculation unit 107 may use either Score1 or Score2 as an equation for obtaining a map score, or may use the product of Score1 and Score2 as a map score.

The positioning reference signal selection unit 308 selects a positioning reference signal to be transmitted from the base station device 10 in each road area based on the above map score. Hereinafter, a function of the positioning reference signal selection unit 308 will be specifically described with reference to an example of signal specification information of FIG. 14. The signal specification information refers to information related to the positioning reference signal, including beamforming setting information and schedule information.

For example, the reception radio wave map stored in the reception radio wave map storage unit 301 includes the reception radio wave map of the positioning reference signal that can be received in a road area R1. If there are multiple reception radio wave maps (for the area R1), the map scores of the reception radio wave maps are compared. Then, the positioning reference signal selection unit 308 selects a positioning reference signal corresponding to the reception radio wave map having the greatest map score as the positioning reference signal in the road area R1.

For example, among the positioning reference signals that is receivable in the road area R1, the positioning reference signal having the identification ID a1 has the maximum map score (0.8). Therefore, in the signal specification information of FIG. 14, at least the positioning reference signal having the identification ID a1 is selected as the positioning reference signal of the road area R1.

Similarly, the positioning reference signal selection unit 308 selects a positioning reference signal respectively for road areas R2 to R9 based on the map score of the reception radio wave map of the positioning reference signal that is receivable in each of those road areas.

The positioning reference signal selection unit 308 may select a plurality of positioning reference signals in one road area.

The information regarding the positioning reference signal selected by the positioning reference signal selection unit 308 is organized as signal specification information as shown in FIG. 14.

The identification ID is information for identifying the positioning reference signal, and is the same as that described with reference to FIGS. 5 and 6. Further, the same identification ID is assigned to the reception radio wave map corresponding to the positioning reference signal, and the reception radio wave map is stored in the reception radio wave map storage unit 301. Therefore, based on such identification ID, the reception radio wave map corresponding to the positioning reference signal can be taken out/picked up from the reception radio wave map storage unit 301.

The base station ID is identification information of a base station device that transmits a positioning reference signal, and is the same as that described with reference to FIGS. 5 and 6.

The transmission weight corresponds to the beamforming setting information and is the same as that described with reference to FIG. 5. Although the transmission weight is directly shown in FIG. 14, any information that can specify the transmission weight may also be used. For example, if there is a predetermined codebook, an ID corresponding to the transmission weight can be used. If it is not specified in the predetermined codebook, a new ID may be defined. Such information is collectively called as transmission weight identification information.

Ch used indicates a subcarrier used by the positioning reference signal. For example, when 10 pieces from Ch1 to Ch10 are used, it indicates that the positioning reference signal is transmitted at the frequency of the subcarrier corresponding to each of Ch1 to Ch10. The positioning reference signal may be transmitted in parallel in time by subcarriers having different frequencies, or may be transmitted by changing the subcarriers in chronological order.

The road area is a specific/identified area of a road and indicates a road area in which the positioning reference signal can be received.

The transmission time corresponds to the schedule information and is the same as that described with reference to FIG. 6. In the present embodiment, the schedule information included in the signal specification information is only the transmission time, and the base station device 10 determines a symbol used, which is/corresponds to the transmission period. Of course, the symbol used may also be included in the signal specification information, i.e., the symbols specified/identified by the reception map server device 30.

The map state indicates a state of the reception radio wave map corresponding to the positioning reference signal. For example, ○ indicates a reception radio wave map regarding which the latest probe data has been sufficiently collected, Δ indicates an incomplete/old reception radio wave map which needs to be updated, and X indicates that no reception radio wave map has been generated.

The map score is a score calculated by the map score calculation unit 307.

The weather condition is a condition of weather when the probe data is collected by the probe terminal device 40. The weather condition shows a recommended weather condition when using a positioning reference signal and a reception radio wave map corresponding thereto.

Note that the signal specification information may be composed of a plurality of positioning reference signal information for each road area.

For example, in the example of FIG. 14, for the road area R1, the information of the positioning reference signal having the identification ID a1 and the information of the positioning reference signal having the identification ID a7 are provided. The positioning reference signal having the identification ID a7 has a lower map score than the positioning reference signal having the identification ID a1, but has a different transmission weight. Further, in the example of FIG. 14, the information of the positioning reference signal having the identification ID a8 is provided as a positioning reference signal whose weather condition is rain.

The signal specification information may include other information. For example, a beam intensity, which is a total transmission power when transmitting a positioning reference signal, may be included.

The beamforming setting information generation unit 309 generates beamforming setting information to be transmitted to the base station device 10 based on the positioning reference signal selected by the positioning reference signal selection unit 308. In the present embodiment, beamforming setting information is generated by extracting the identification ID, the base station ID, and the transmission weight from the signal specification information of FIG. 14.

The first server transmission unit 303 transmits the beamforming setting information to the base station device 10.

The schedule information generation unit 310 generates schedule information to be transmitted to the base station device 10 based on the positioning reference signal selected by the positioning reference signal selection unit 308. In the present embodiment, schedule information is generated by extracting the identification ID, the base station ID, and the transmission time from the signal specification information of FIG. 14.

The first server transmission unit 303 transmits the schedule information to the base station device 10. The schedule information may be transmitted from the second server transmission unit 304 to the terminal device 20.

(4) Summary

As described above, according to the reception map server device 30 of the present embodiment, since the reception radio wave map is provided for each positioning reference signal, a reception radio wave map corresponding to a positioning reference signal having higher positioning accuracy is providable to the terminal device 20. Further, since the beamforming setting information is generated based on a reception radio wave map having a high score, the base station device 10 provided with such beamforming setting information can transmit a positioning reference signal having higher positioning accuracy. Further, since the schedule information is generated based on a reception radio wave map having a high score, the base station device 10 provided with such schedule information can transmit a positioning reference signal having higher positioning accuracy. Further, since the schedule information can also be provided to the terminal device 20, the terminal device 20 can know, in advance, the schedule information of the positioning reference signal. Thus, it is possible to provide the base station device 10 with information suitable for positioning of each of the terminal devices 20 according to (i) the area where the terminal device exists, and (ii) the reception environment of such area, and the like, thereby contributing to the improvement of the positioning accuracy of each of the terminal devices 20.

5. Details 4: Operation of Each Device

Figure 15:
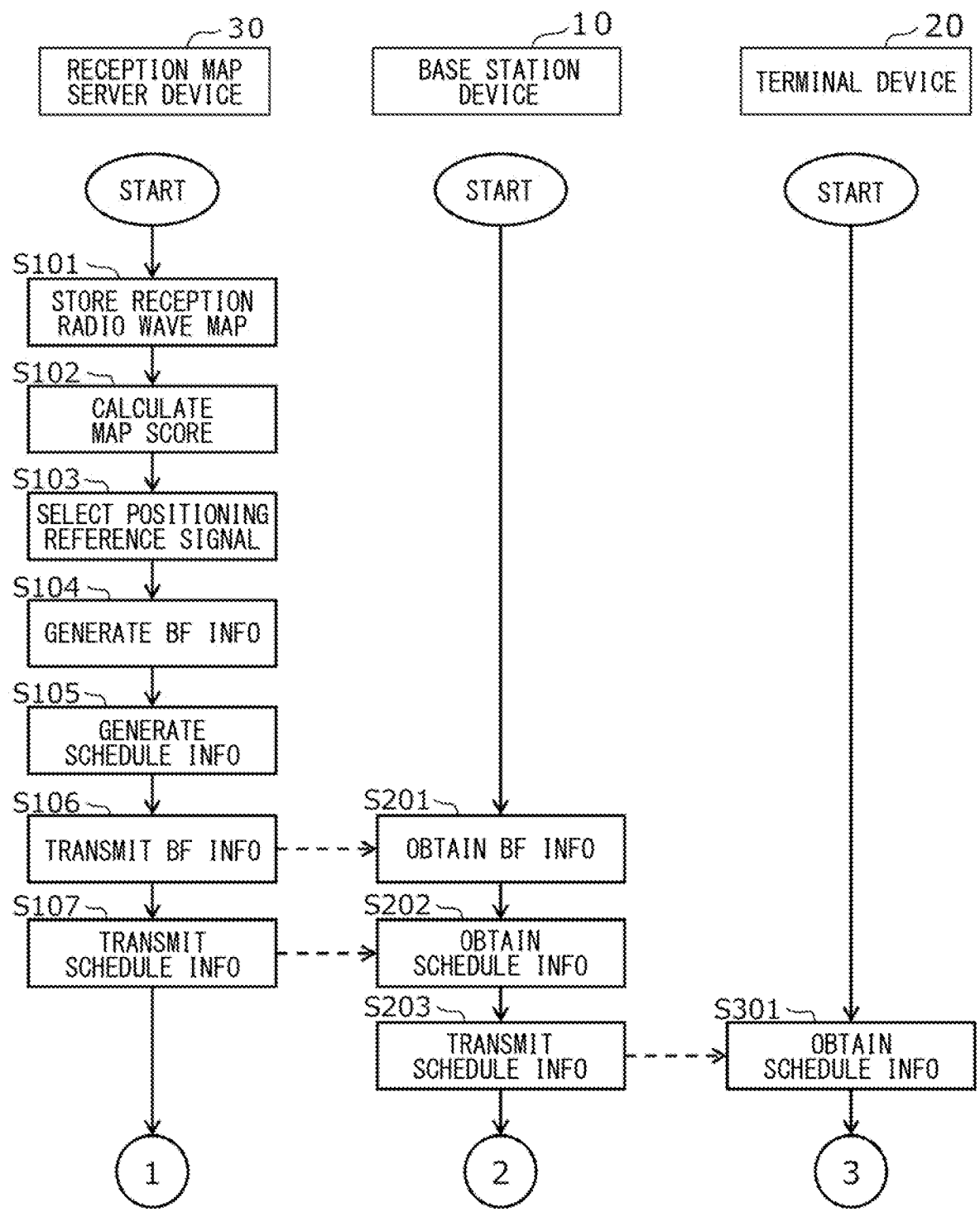
FIG. 15 is a flowchart showing an operation of the reception map server device, the base station device, and the terminal device in a positioning process of the terminal device according to the embodiment of the present disclosure.
Figure 16:
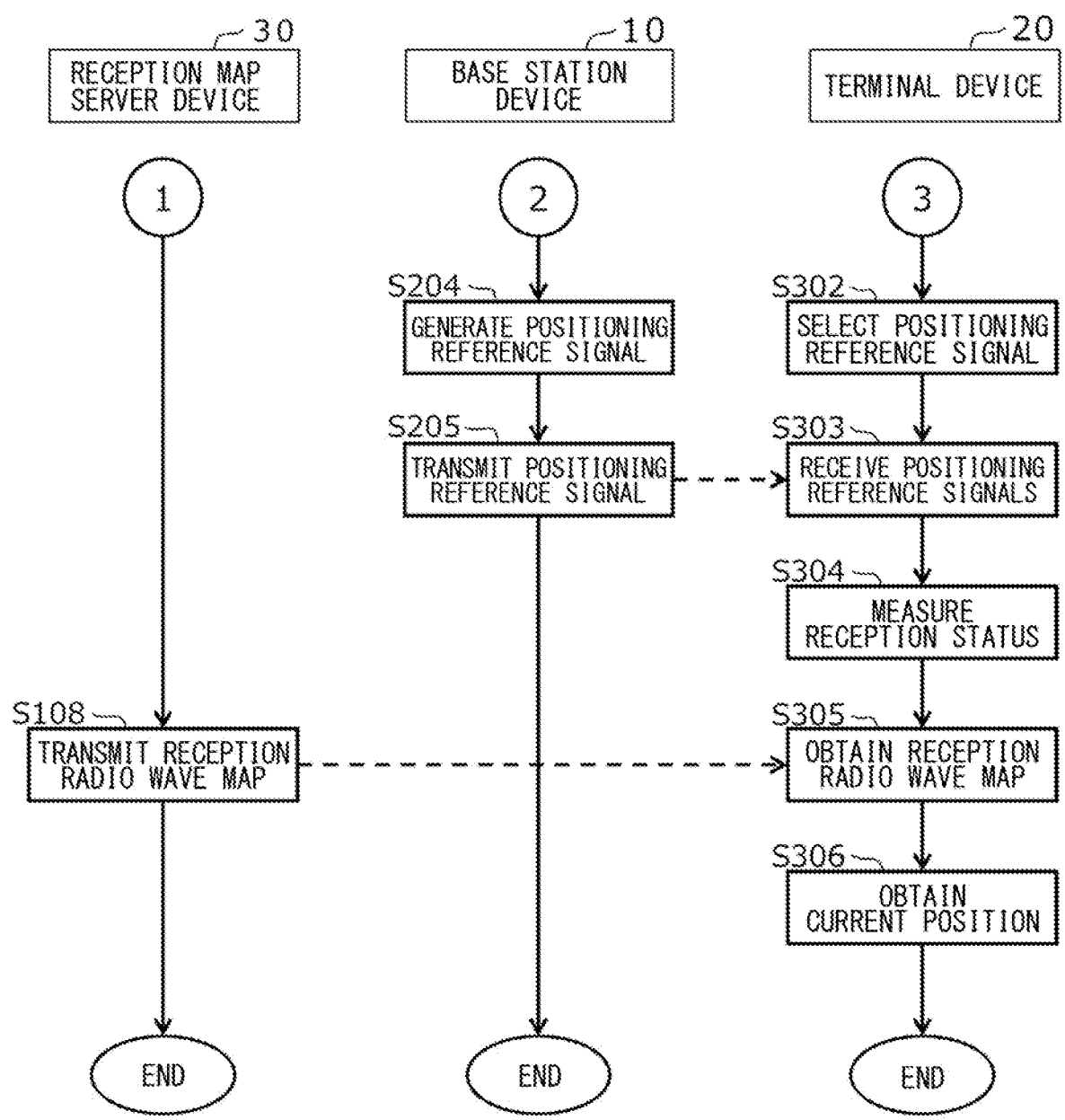
FIG. 16 is another flowchart showing an operation of the reception map server device, the base station device, and the terminal device in the positioning process of the terminal device according to the embodiment of the present disclosure.

The reception map server device 30 and the base station device 10 are involved in a positioning process in the terminal device 20. Hereinafter, the operations of the reception map server device 30, the base station device 10, and the terminal device 20 in the positioning process of the terminal device 20 of the present embodiment will be described with reference to the flowcharts of FIGS. 15 and 16. In the present embodiment, a case where the terminal device 20 receives the schedule information from the base station device 10 will be described.

In the reception map server device 30, the reception radio wave map storage unit 301 stores a reception radio wave map in advance for each positioning reference signal (S101). The map score calculation unit 307 calculates a map score based on the reception radio wave map stored in the reception radio wave map storage unit 301 (S102). The positioning reference signal selection unit 308 selects one or a plurality of positioning reference signals to be transmitted from the base station device 10 based on the map score in each road area (S103). The beamforming setting information generation unit 309 generates beamforming setting information (described as BF information in the drawing) to be transmitted to the base station device 10 based on the positioning reference signal selected by the positioning reference signal selection unit 308 (S104). The schedule information generation unit 310 generates schedule information to be transmitted to the base station device 10 based on the positioning reference signal selected by the positioning reference signal selection unit 308 (S105). The first server transmission unit 303 transmits the beamforming setting information to the base station device 10 (S106). The first server transmission unit 303 transmits schedule information to the base station device (S107).

In the base station device 10, the beamforming setting information obtaining unit 101 obtains the beamforming setting information from the reception map server device 30 (S201). The schedule information obtaining unit 102 obtains schedule information from the reception map server device 30 (S202). The transmission unit 106 transmits the schedule information received from the reception map server device 30 to the terminal device 20 (S203).

In the terminal device 20, the schedule information obtaining unit 202 obtains schedule information from the base station device 10 via the first communication unit 201 (S301). The positioning reference signal selection unit 204 selects a positioning reference signal to be used by itself from among the positioning reference signals transmitted from the base station device 10 based on the schedule information and the reception environment (S302).

In the base station device 10, the positioning reference signal generation unit 105 generates a positioning reference signal based on the beamforming setting information (S204). The transmission unit 205 transmits a positioning reference signal to the terminal device 20 based on the schedule information transmitted in S203 (S205).

In the terminal device 20, the first communication unit 201 receives a plurality of positioning reference signals (S303). The reception status measurement unit 205 measures a reception status of the positioning reference signal selected by the positioning reference signal selection unit 204 (S304).

In the reception map server device 30, the second server transmission unit 304 transmits the reception radio wave map to the terminal device 20 in response to a request from the terminal device 20 (S108).

In the terminal device 20, the reception map obtaining unit 207 obtains a reception radio wave map from the reception map server device 30 via the second communication unit 206 (S305). The position obtaining unit 209 obtains a current position of the terminal device 20 based on a measurement result of the reception status and the reception radio wave map obtained from the reception map obtaining unit 207 (S306).

The above operation not only shows a method performed in each device, but also shows the processing procedure of a program that can be executed in each device. Further, these processes are not limited to an order of the steps shown in FIGS. 15 and 16. That is, the order may be changed as long as there are no restrictions such as a relationship in which a result of a preceding step is used in a certain step.

6. Conclusive Summary

The features of the base station device, the terminal device, and the reception map server device according to an embodiment of the present disclosure have been described above. Since the terms used in the embodiment are examples, the terms may be replaced with terms that are synonymous or that include synonymous functions.

The block diagram used for the description of the embodiment is obtained by classifying and arranging the configurations of the device for each function. An individual function of the functional blocks may be implemented by (i) hardware alone (i.e., by using hardware circuitry including digital and/or analog circuits without CPU), or (ii) software alone (i.e., by using CPU along with memory storing program instructions), or (iii) any combination of the hardware and the software. Further, since the block diagram illustrates the functions, the block diagram can also be understood as a disclosure of a method and a program that implements the method.

For the processes, flows, and blocks that can be grasped as a method described in the embodiment, an order of processing/flow/method may be changeable unless otherwise restricted, like one step use a processing result of other, preceding step or the like.

The terms such as first, second, to N-th (where N is an integer) used in the embodiment and in the claims are used to distinguish two or more configurations and methods of the same kind and are not intended to limit an order, a level or priority.

Although the terminal device in the embodiment has been described as a device mounted on a vehicle, the present disclosure also includes a dedicated or general-purpose device other than that for a vehicle, unless otherwise limited within the scope of the claims.

Although the terminal device in the embodiment has been described as a device mounted on a vehicle, it may be a device possessed by a pedestrian.

Examples of the form of the terminal device of the present disclosure include the following. Examples in a form of a component include a semiconductor device, an electronic circuit, a module, and a microcomputer. Examples in a form of a semi-finished product include an electronic control device (i.e., an electronic control unit or so-called ECU) and a system board. Examples in a form of a finished product include a cellular phone, a smartphone, a tablet computer, a personal computer (PC), a workstation, and a server. The devices may include a device having a communication function and the like, and include, for example, a video camera, a still camera, and a car navigation system.

Required functions such as an antenna and a communication interface may be added to the base station device, the terminal device, and the reception map server device of the present disclosure.

It is assumed that the base station device, the terminal device, and the reception map server device of the present disclosure are used for the purpose of providing various services. When providing such services, the devices of the present disclosure will be used, the methods of the present disclosure will be used, and/or the programs of the present disclosure will be executed.

In addition, the base station device, the terminal device, and the reception map server device of the present disclosure can not only be realized by the dedicated hardware having the configuration and the function described in the embodiment, but can also be realized by a combination of a program for realizing the present disclosure stored in a recording medium such as a memory or a hard disk and a general-purpose hardware having a dedicated or general-purpose CPU and memory capable of executing the same.

A program stored in a non-transitory, tangible storage medium (for example, (i) an external storage device (a hard disk, a USB memory, a CD/BD, or the like) of dedicated or general-purpose hardware, or (ii) an internal storage device (a RAM, a ROM, or the like) may also be provided to dedicated or general-purpose hardware via a recording medium or from a server via a communication line without using the recording medium. As a result, it is possible to always provide a latest function by updating the program.

INDUSTRIAL APPLICABILITY

The base station device and the reception map server device of the present disclosure are supposed to provide a service for positioning by communicating with a device mounted on a vehicle that travels mainly on a road, but such a service may also be providable to other mobile/movable object/body such as a bicycle with an electric motor, a railway car, as well as a pedestrian, a ship, an aircraft and the like. The terminal device of the present disclosure has been described as a device mounted on a vehicle, for example, but the terminal device is also applicable to a vehicle including a motorcycle, a mobile body such as a bicycle with an electric motor, a railroad car, a pedestrian, a ship, an aircraft, and the like. In addition, it can be applied to devices used for various purposes such as mobile phones, tablets, and game machines.

What is claimed is:

1. A base station device comprising:
    at least one processor; and
    at least one memory storing a computer program comprising instructions configured to, when executed by the at least one processor, carry out
        obtaining from a reception map server device a plurality of beamforming setting information including a transmission weight;
        generating a plurality of positioning reference signals using each of the plurality of beamforming setting information;
        obtaining schedule information indicating a transmission schedule of the plurality of positioning reference signals;
        transmitting each of the plurality of positioning reference signals based on the schedule information;
        obtaining a reference signal information;
        generating a reference signal based on the reference signal information; and
        multiplying the reference signal by the transmission weight to generate each of the plurality of positioning reference signals.

2. The base station device of claim 1, wherein the at least one processor further transmits the schedule information.

3. The base station device of claim 1, wherein the schedule information includes a transmission period or a transmission time of at least one of the positioning reference signals.

4. A terminal device comprising:
    a processor and memory configured to:
    receive positioning reference signals transmitted from a base station device based on beamforming setting information;
    obtain schedule information indicating a transmission schedule of the positioning reference signals;
    select a positioning reference signal used by the terminal device itself from the positioning reference signals based on the schedule information;
    measure a reception status of the selected positioning reference signal;
    obtain a reception map (a) associated with (i) an identified position and (ii) a state or an estimation result of a reception propagation path at the identified position, and (b) corresponding to the positioning reference signal selected; and
    obtain a position of the terminal device based on a measurement result of the reception status and the reception map.

5. The terminal device of claim 4, wherein the schedule information includes a transmission period or a transmission time of at least one of the positioning reference signals.

6. The terminal device of claim 4, wherein the terminal device obtains the schedule information by receiving the schedule information from the base station device.

7. The terminal device of claim 4, wherein the terminal device obtains the reception map by receiving the schedule information from the reception map server device that generates the reception map.

8. The terminal device of claim 7, wherein the terminal device obtains the schedule information by receiving the schedule information from the reception map server device.

9. The terminal device of claim 4, wherein the processor is further configured to:
    detect a reception environment around the terminal device itself, wherein
    the processor selects a positioning reference signal based at least partially on the schedule information and at least partially on the reception environment.

10. The terminal device of claim 4, wherein the terminal device is mounted on a mobile body.

11. A method of transmitting a positioning reference signal, the method performed in a base station device, the method comprising steps of:
    obtaining from a reception map server device beamforming setting information including a transmission weight;
    generating positioning reference signals using the beamforming setting information;
    obtaining schedule information indicating a transmission schedule of the positioning reference signals;

transmitting the positioning reference signals based on the schedule information;
obtaining a reference signal information;
generating a reference signal based on the reference signal information; and
multiplying the reference signal by the transmission weight to generate the positioning reference signals.

12. A non-transitory computer-readable storage medium storing instructions for transmitting positioning reference signals, the instructions executable by a processor in a base station device, the instructions comprising:
obtaining from a reception map server device beamforming setting information including a transmission weight;
generating positioning reference signals using the beamforming setting information;
obtaining schedule information indicating a transmission schedule of the positioning reference signals;
transmitting the positioning reference signals based on the schedule information;
obtaining a reference signal information;
generating a reference signal based on the reference signal information; and
multiplying the reference signal by the transmission weight to generate the positioning reference signals.

13. A method of positioning performed in a terminal device, the method comprising steps of:
receiving positioning reference signals respectively transmitted from a base station device based on beamforming setting information;
obtaining schedule information that indicates a transmission schedule of the positioning reference signals;
selecting a positioning reference signal to be used by the terminal device from among the positioning reference signals based on the schedule information;
measuring a reception status of the selected positioning reference signal;
obtaining a reception map (a) associated with (i) an identified position and (ii) a state or an estimation result of a reception propagation path at the identified position, and (b) corresponding to the selected positioning reference signal; and
obtaining a position of the terminal device based on a result of measuring the reception status and the reception map.

14. A non-transitory computer-readable storage medium storing instructions for positioning a terminal device, the instructions executable by a processor in the terminal device, the instructions comprising:
receiving positioning reference signals respectively transmitted from a base station device based on beamforming setting information;
obtaining schedule information that indicates a transmission schedule of the positioning reference signals;
selecting a positioning reference signal to be used by the terminal device from among the positioning reference signals based on the schedule information;
measuring a reception status of the selected positioning reference signal;
obtaining a reception map (a) associated with (i) an identified position and (ii) a state or an estimation result of a reception propagation path at the identified position, and (b) corresponding to the selected positioning reference signal; and
obtaining a position of the terminal device based on a result of measuring the reception status and the reception map.

15. The base station device of claim 1, wherein
the reference signal is a pilot signal having a fixed value.

16. The base station device of claim 1, wherein
the at least one processor and the at least one memory further carry out storing the reference signal information, and
obtaining the stored reference signal information.

17. The base station device of claim 1, wherein
the beamforming setting information is information for identifying a beam shape of the positioning reference signals.

18. The base station device of claim 1, wherein
the at least one processor transmits the positioning reference signals simultaneously at a plurality of different frequencies, respectively.

19. The base station device of claim 1, wherein
the beamforming setting information is generated by the reception map server device.

* * * * *